(12) United States Patent
Kawai

(10) Patent No.: US 8,599,302 B2
(45) Date of Patent: Dec. 3, 2013

(54) VIBRATING DEVICE AND IMAGE EQUIPMENT HAVING THE SAME

(75) Inventor: Sumio Kawai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 192 days.

(21) Appl. No.: 13/220,437

(22) Filed: Aug. 29, 2011

(65) Prior Publication Data

US 2012/0057066 A1 Mar. 8, 2012

(30) Foreign Application Priority Data

Sep. 3, 2010 (JP) ................................. 2010-198106

(51) Int. Cl.
  *H04N 5/225* (2006.01)
(52) U.S. Cl.
  USPC ............ 348/340; 348/373; 348/374; 348/375
(58) Field of Classification Search
  None
  See application file for complete search history.

(56) References Cited

U.S. PATENT DOCUMENTS

| | | |
|---|---|---|
| 2004/0169761 A1 | 9/2004 | Kawai et al. |
| 2009/0002541 A1* | 1/2009 | Niwamae ....................... 348/335 |
| 2009/0002542 A1* | 1/2009 | Ito et al. ........................ 348/340 |
| 2009/0011243 A1* | 1/2009 | Yamada et al. ............... 428/409 |
| 2010/0091121 A1* | 4/2010 | Kawai ........................ 348/208.7 |
| 2010/0158501 A1* | 6/2010 | Kawai ............................ 396/448 |
| 2010/0165121 A1* | 7/2010 | Kawai et al. ............. 348/207.99 |
| 2010/0165170 A1* | 7/2010 | Kawai et al. .................. 348/335 |
| 2010/0165186 A1* | 7/2010 | Kawai et al. .................. 348/375 |
| 2010/0165187 A1* | 7/2010 | Miyazawa ..................... 348/375 |
| 2010/0165462 A1* | 7/2010 | Kawai et al. .................. 359/513 |
| 2010/0220394 A1* | 9/2010 | Kawai ............................ 359/508 |
| 2010/0231780 A1* | 9/2010 | Kawai ............................ 348/335 |
| 2010/0315711 A1* | 12/2010 | Kashiyama .................. 359/508 |
| 2010/0315712 A1* | 12/2010 | Kawai ............................ 359/508 |
| 2010/0316371 A1* | 12/2010 | Kawai ............................ 396/439 |
| 2010/0325825 A1* | 12/2010 | Kawai .............................. 15/94 |
| 2011/0261245 A1* | 10/2011 | Kawai et al. .................. 348/335 |
| 2011/0261246 A1* | 10/2011 | Kawai et al. .................. 348/335 |
| 2011/0262126 A1* | 10/2011 | Kawai et al. .................. 396/529 |
| 2011/0262127 A1* | 10/2011 | Kawai et al. .................. 396/529 |
| 2012/0099198 A1* | 4/2012 | Sunaga ......................... 359/508 |
| 2012/0162500 A1* | 6/2012 | Yoshida ........................ 348/373 |

FOREIGN PATENT DOCUMENTS

JP 2007-228246 A 9/2007

* cited by examiner

*Primary Examiner* — Lin Ye
*Assistant Examiner* — John H Morehead, III
(74) *Attorney, Agent, or Firm* — Holtz, Holtz, Goodman & Chick, PC

(57) ABSTRACT

A vibrating device includes a dust-screening member and a vibrating member. The dust-screening member is disposed in front of an image surface of an image forming element having the image surface in which an optical image is generated. The dust-screening member has a box shape with about the same small plate thickness as a whole, and includes, in a bottom surface portion of the box shape, a transparent part which spreads from the center of the bottom surface portion. The vibrating member is disposed outside the transparent part of the dust-screening member. The vibrating member is configured to generate, in the bottom surface portion of the dust-screening member, vibration having a vibrational amplitude which is vertical to the bottom surface portion thereof.

3 Claims, 16 Drawing Sheets

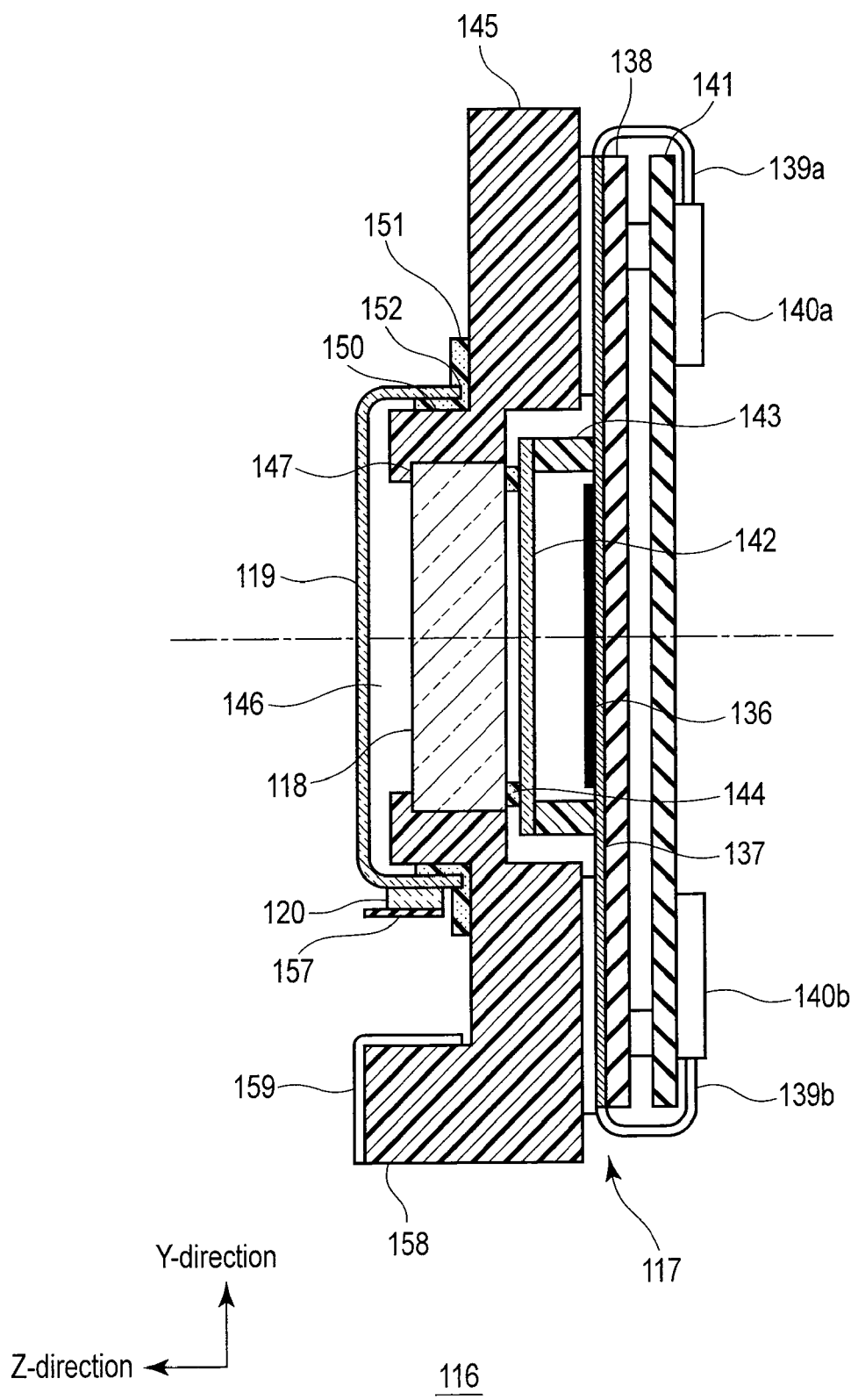
F I G. 2A

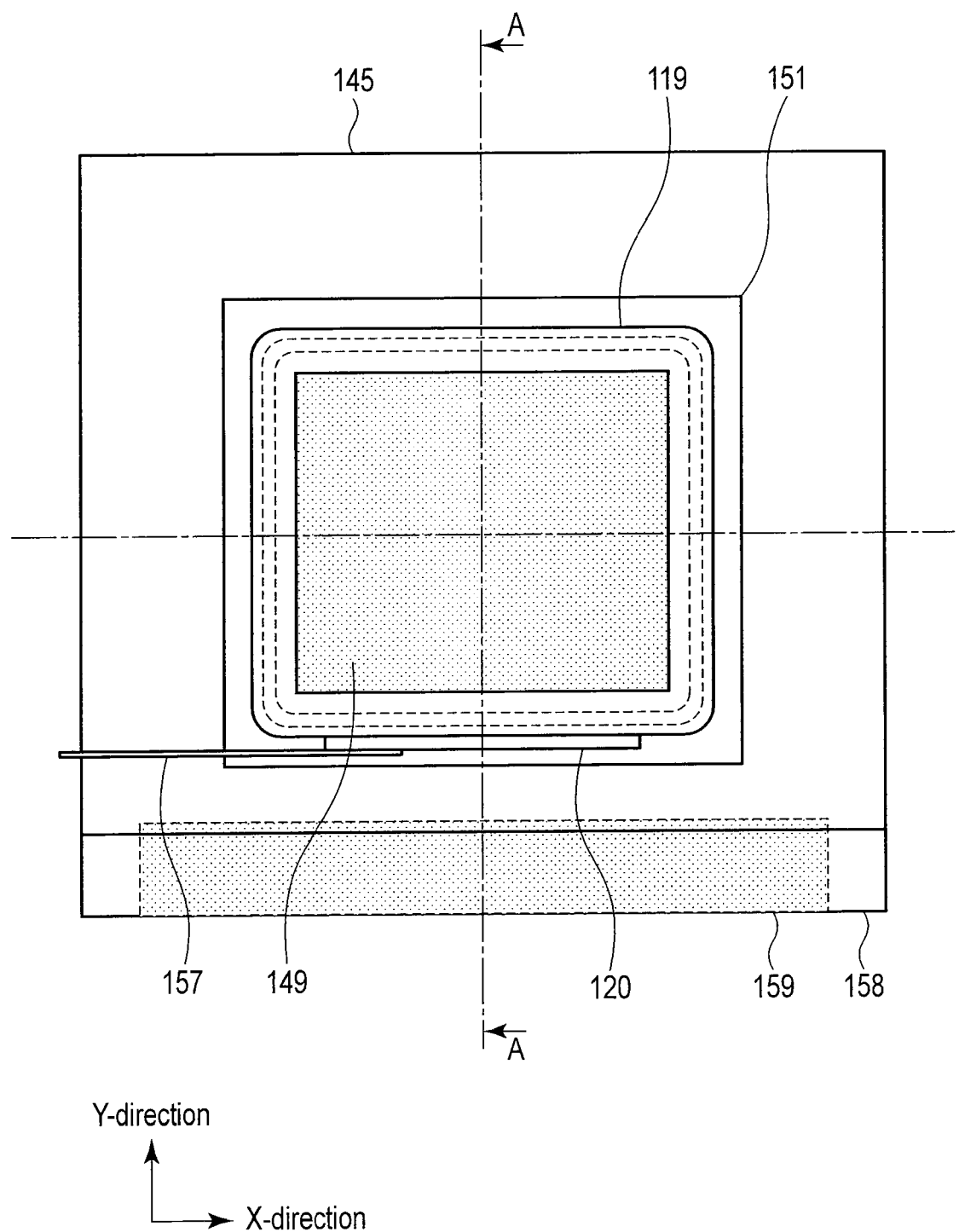
F I G. 2B

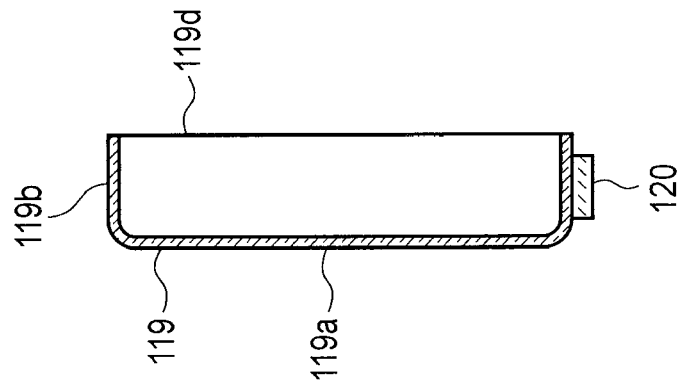
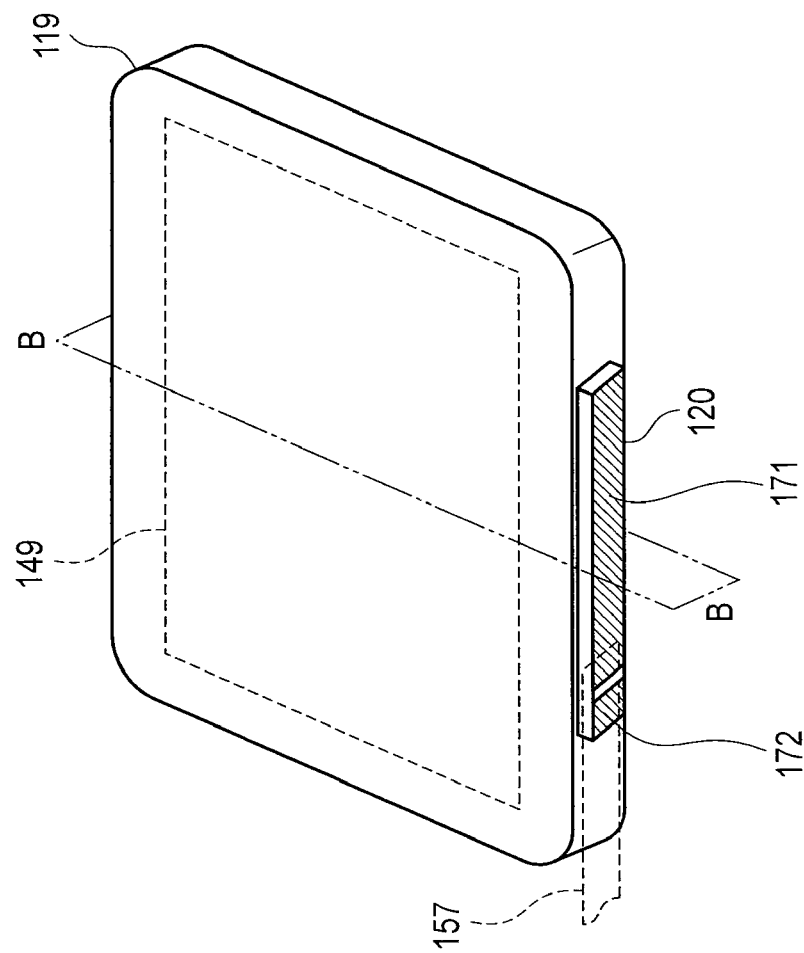

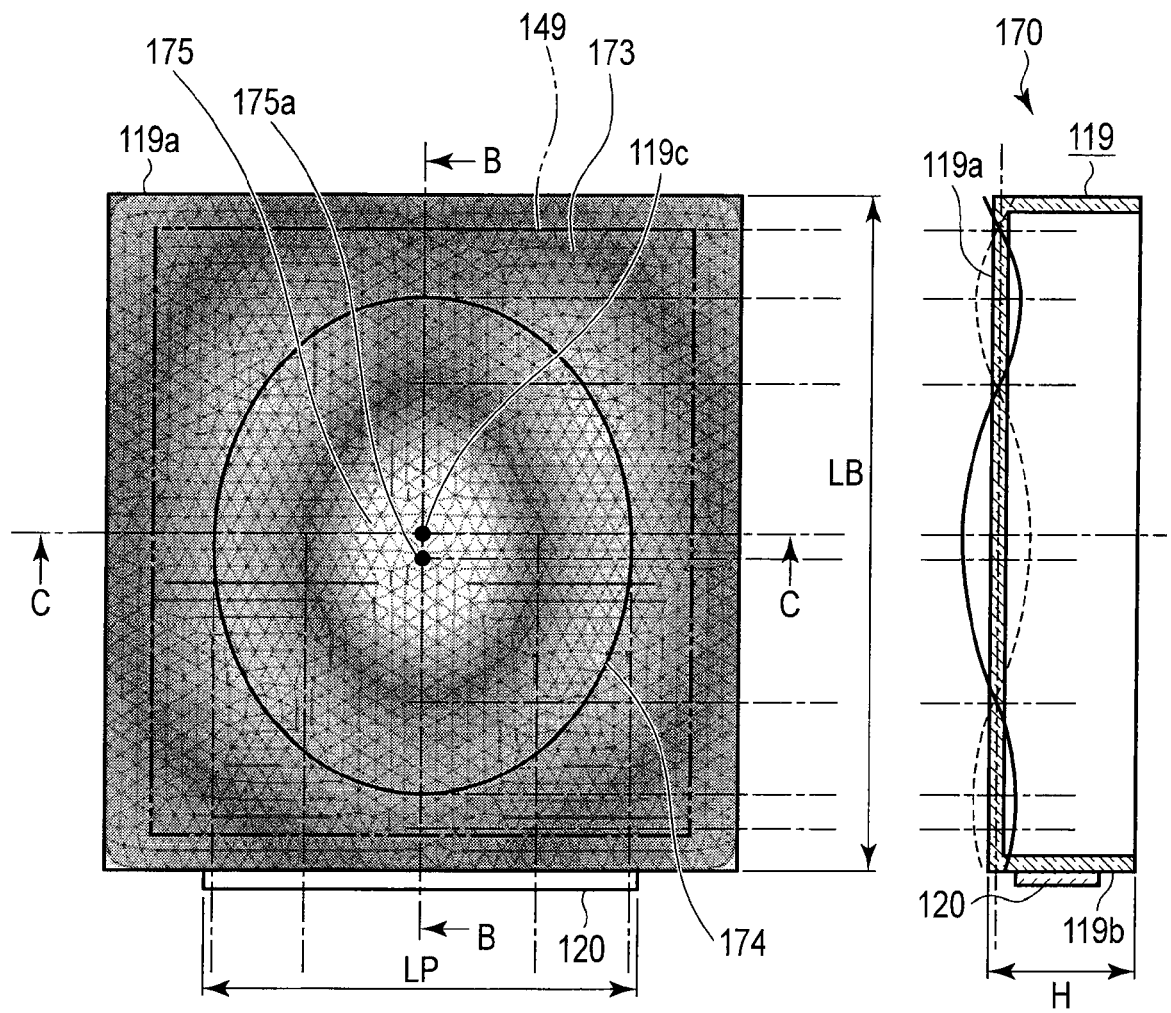
F I G. 4A    F I G. 4B
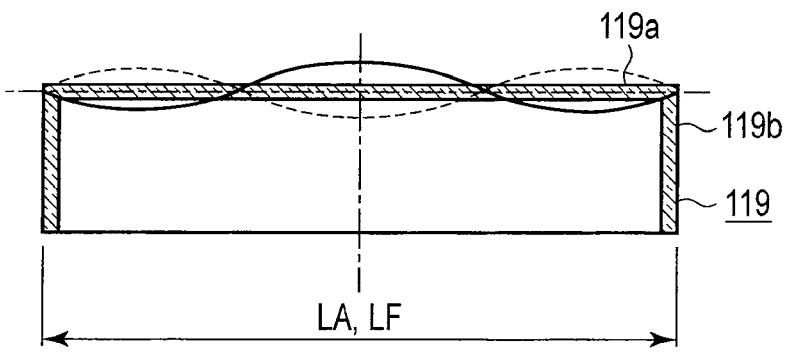
F I G. 4C

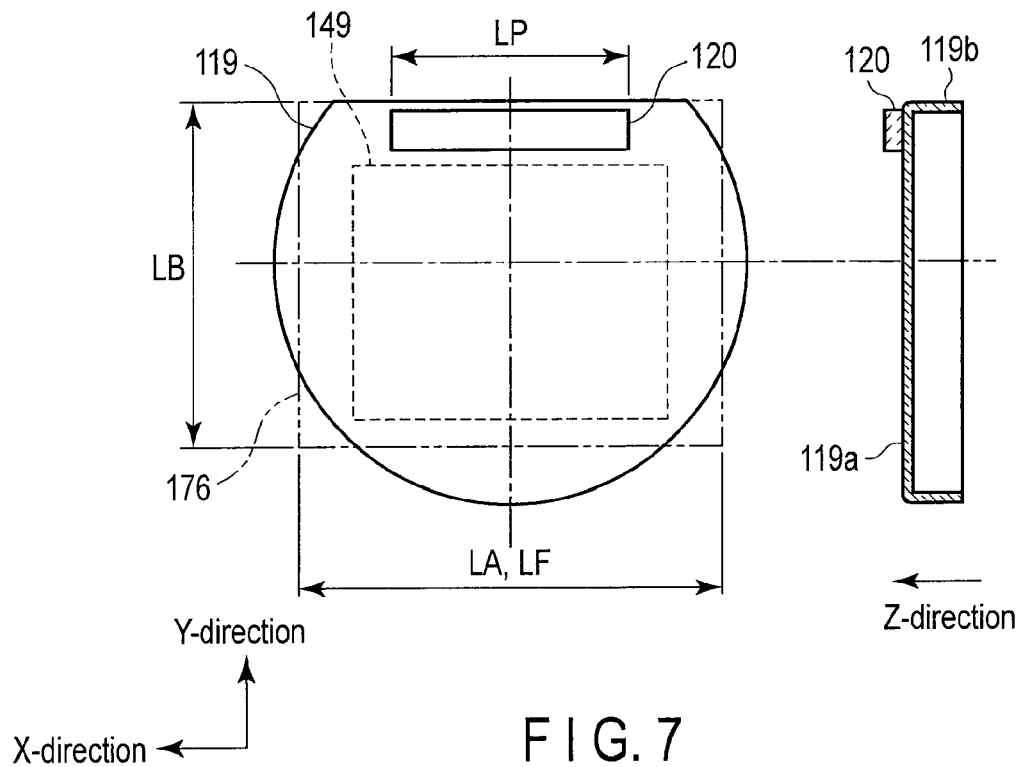
F I G. 7
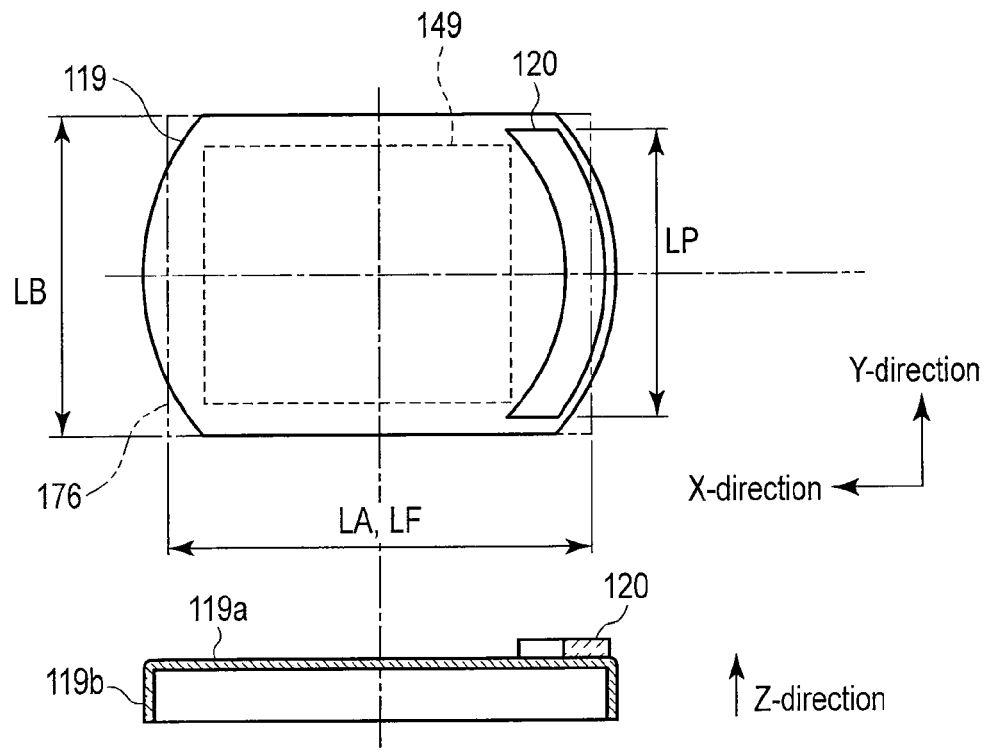
F I G. 8

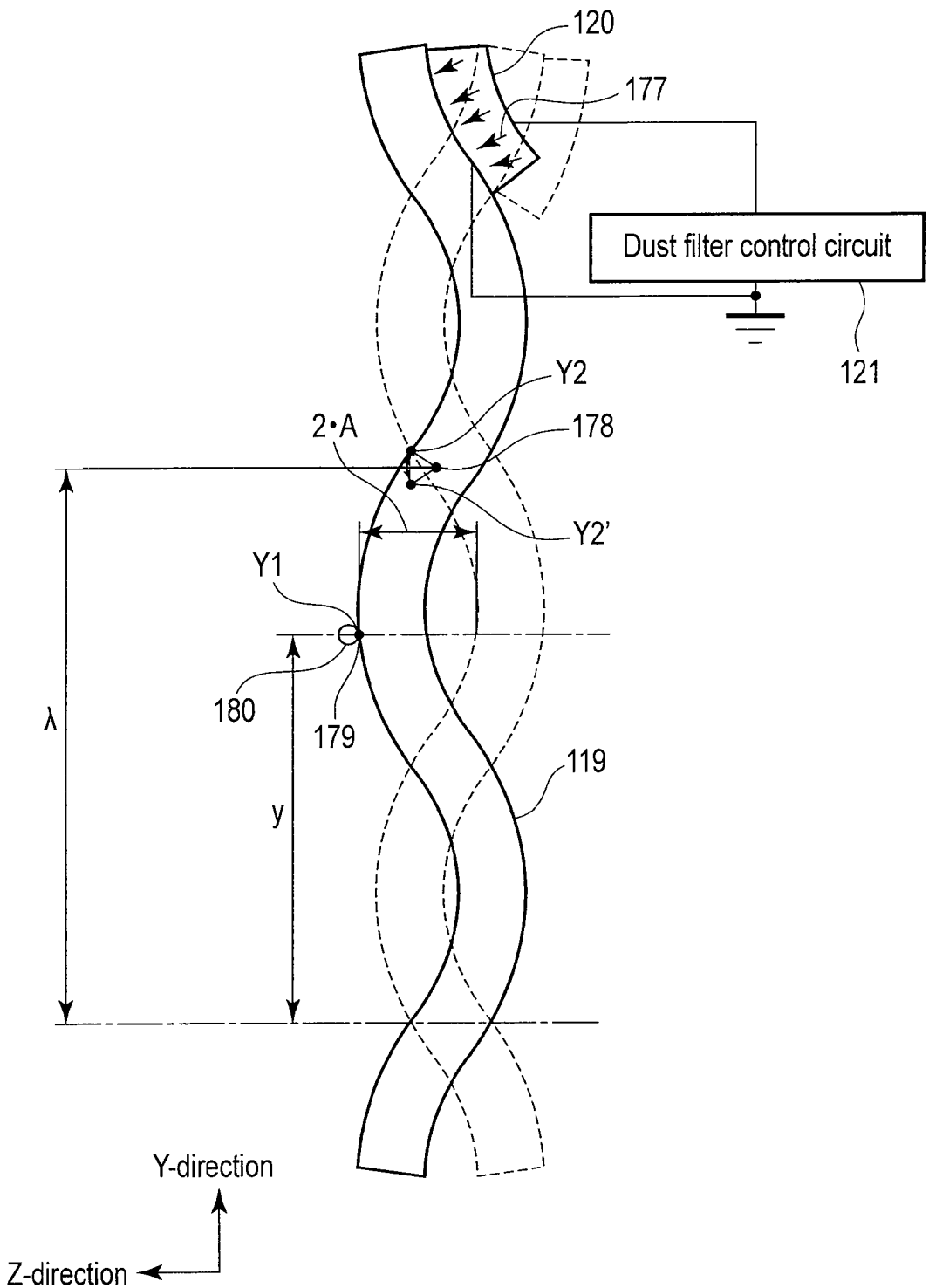
F I G. 11

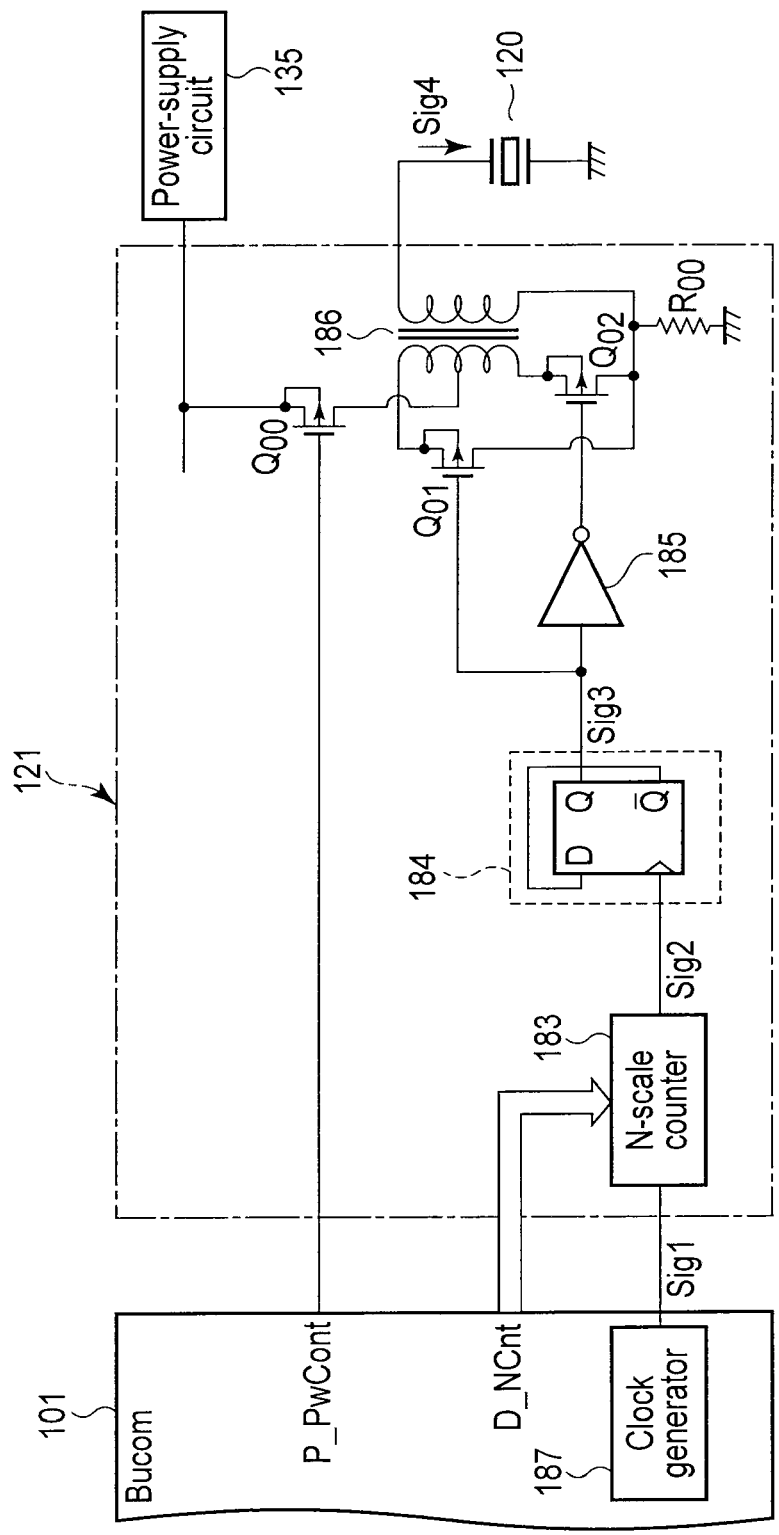
F I G. 12

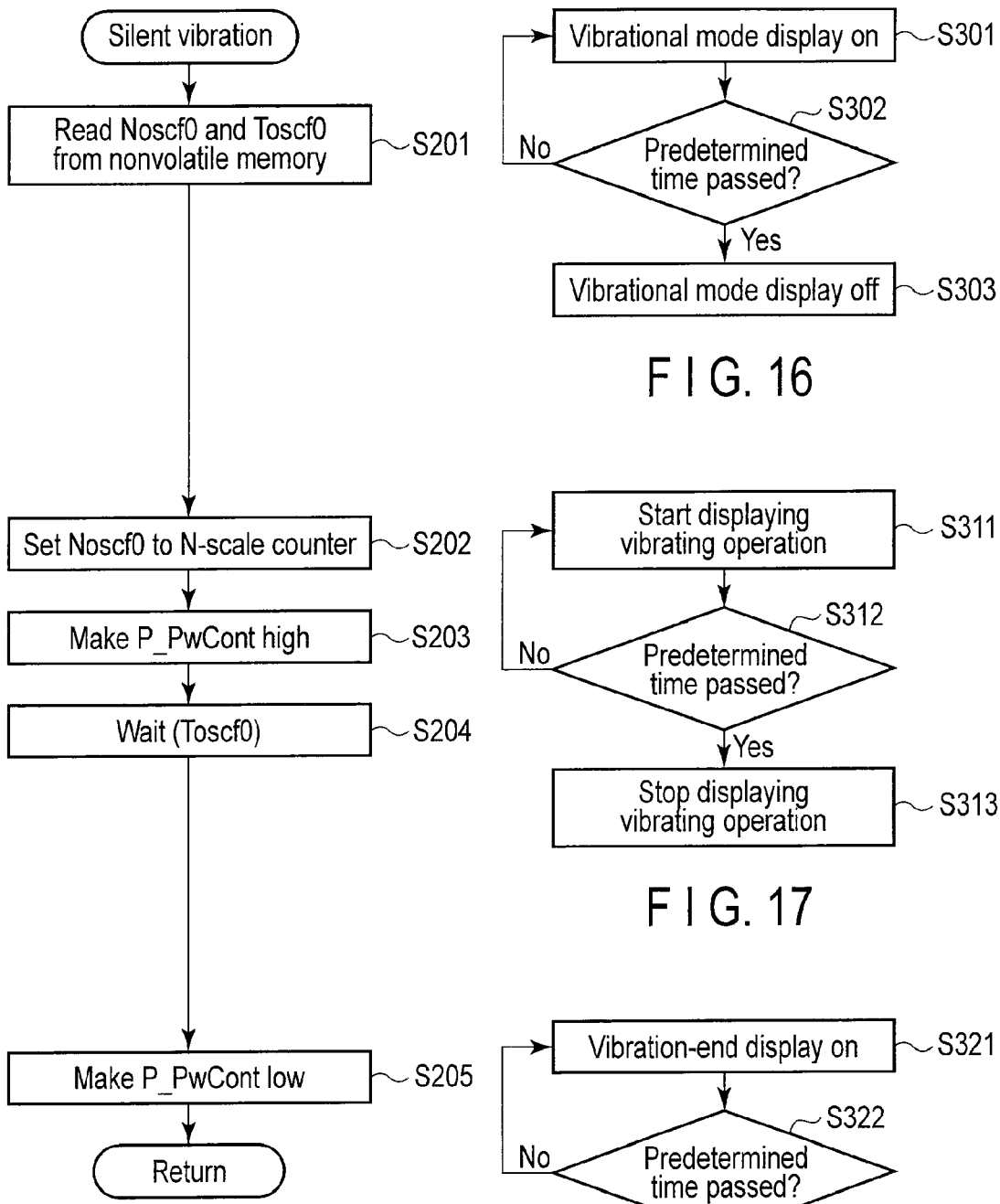

VIBRATING DEVICE AND IMAGE EQUIPMENT HAVING THE SAME

CROSS-REFERENCE TO RELATED APPLICATIONS

This application is based upon and claims the benefit of priority from prior Japanese Patent Application No. 2010-198106, filed Sep. 3, 2010, the entire contents of which are incorporated herein by reference.

BACKGROUND OF THE INVENTION

1. Field of the Invention

The present invention relates to image equipment having image forming elements such as an image sensor element or a display element, and also to a vibrating device designed to vibrate the dust-screening member that is arranged at the front of each image forming element of such an image equipment.

2. Description of the Related Art

As image equipment having image forming elements, there is known an image acquisition apparatus that has an image sensor element configured to produce a video signal corresponding to the light applied to its photoelectric conversion surface. Also known is an image projector that has a display element, such as liquid crystal element, which displays an image on a screen. In recent years, image equipment having such image forming elements have been remarkably improved in terms of image quality. If dust adheres to the surface of the image forming element such as the image sensor element or display element or to the surface of the transparent member (optical element) that is positioned in front of the image forming element, the image produced will have shadows of the dust particles. This makes a great problem.

For example, digital cameras of called "lens-exchangeable type" have been put to practical use, each comprising a camera body and a photographic optical system removably attached to the camera body. The lens-exchangeable digital camera is so designed that the user can use various kinds of photographic optical systems, by removing the photographic optical system from the camera body and then attaching any other desirable photographic optical system to the camera body. When the photographic optical system is removed from the camera body, the dust floating in the environment of the camera flows into the camera body, possibly adhering to the surface of the image sensor element or to the surface of the transparent member (optical element), such as a lens, cover glass or the like, that is positioned in front of the image sensor element. The camera body contains various mechanisms, such as a shutter and a diaphragm mechanism. As these mechanisms operate, they produce dust, which may adhere to the surface of the image sensor element as well.

Projectors have been put to practical use, too, each configured to enlarge an image displayed by a display element (e.g., CRT or liquid crystal element) and project the image onto a screen so that the enlarged image may be viewed. In such a projector, too, dust may adhere to the surface of the display element or to the surface of the transparent member (optical element), such as a lens, cover glass or the like, that is positioned in front of the display element, and enlarged shadows of the dust particles may inevitably be projected to the screen.

Various types of mechanisms that remove dust from the surface of the image forming element or the transparent member (optical element) that is positioned in front of the image sensor element, provided in such image equipment have been developed.

In an electronic image acquisition apparatus disclosed in, for example, U.S. 2004/0169761 A1, a ring-shaped piezoelectric element (vibrating member) is secured to the circumferential edge of a glass plat shaped like a disc (dust-screening member). When a voltage of a prescribed frequency is applied to the piezoelectric element, the glass plat shaped like a disc undergoes a standing-wave, bending vibration having nodes at the concentric circles around the center of the glass plat shaped like a disc. This vibration removes the dust from the glass disc. The vibration (vibrational mode 1) produced by the voltage of the prescribed frequency is a standing wave having nodes at the concentric circles around the center of the disc. The dust particles at these nodes cannot be removed, because the amplitude of vibration at the nodes is small. In view of this, the glass plat shaped like a disc is vibrated at a different frequency, achieving a standing-wave vibration (vibrational mode 2) that has nodes at concentric circles different from those at which the nodes of vibrational mode 1 are located. Thus, those parts of the glass disc, where the nodes lie in vibrational mode 1, are vibrated at large amplitude.

Jpn. Pat. Appln. KOKAI Publication No. 2007-228246 discloses a rectangular dust-screening member and piezoelectric elements secured to the opposite sides of the dust-screening member, respectively. The piezoelectric elements produce vibration at a predetermined frequency, resonating the dust-screening member. Vibration is thereby achieved in such mode that nodes extend parallel to the sides of the dust-screening member. Further, as in the mechanism of U.S. 2004/0169761 A1, the dust-screening member is made to resonate at a different frequency, accomplishing a standing-wave vibrational mode, in order to change the opposition of nodes. Any one of these vibrational modes achieves bending vibration having nodes extending parallel to the sides of the dust-screening member.

BRIEF SUMMARY OF THE INVENTION

According to a first aspect of the present invention, there is provided a vibrating device comprising:

a dust-screening member disposed in front of an image surface of an image forming element having the image surface in which an optical image is generated, the dust-screening member having a box shape with about the same small plate thickness as a whole, and including, in a bottom surface portion of the box shape, a transparent part which spreads from the center of the bottom surface portion; and a vibrating member disposed outside the transparent part of the dust-screening member and configured to generate, in the bottom surface portion of the dust-screening member, vibration having a vibrational amplitude which is vertical to the bottom surface portion thereof.

According to a second aspect of the present invention, there is provided an image equipment comprising:

an image forming element having an image surface in which an optical image is generated;

a dust-screening member disposed in front of the image surface of the image forming element, the dust-screening member having a box shape with about the same small plate thickness as a whole, and including, in a bottom surface portion of the box shape, a transparent part which spreads from the center of the bottom surface portion;

a vibrating member disposed outside the transparent part of the dust-screening member and configured to generate, in the bottom surface portion of the dust-screening member, vibration having a vibrational amplitude which is vertical to the bottom surface portion thereof; and a sealing structure portion configured to seal a space portion on the side of circumferential edges of the image forming element and the dust-screening member and to constitute the sealed space portion in a portion where both the image forming element and the dust-screening member are formed to face each other.

According to a third aspect of the present invention, there is provided a vibrating device comprising:

a dust-screening member disposed in front of an image surface of an image forming element having the image surface in which an optical image is generated, the dust-screening member being configured to have a box shape which includes a bottom surface portion having a light transmitting part through which one of light coming from the image forming element and light coming into the image forming element transmits, and side wall portions which tilt as much as a predetermined angle and extend from all end face portions of the bottom surface portion in a direction of the image forming element, and is formed so that at least the bottom surface portion has a substantially uniform small thickness; and a vibrating member disposed in one of a position of the dust-screening member other than the light transmitting part of the bottom surface portion and a flat surface portion of the side wall portion, and configured to apply, to the bottom surface portion of the dust-screening member, a vibrational amplitude which is vertical to the bottom surface portion thereof.

According to a fourth aspect of the present invention, there is provided an image equipment comprising:

an image forming unit including an image forming element having an image surface in which an optical image is generated;

a dust-screening member disposed in front of an image surface of the image forming element, the dust-screening member being configured to have a box shape which includes a bottom surface portion having a light transmitting part through which one of light coming from the image forming element and light coming into the image forming element transmits, and side wall portions which tilt as much as a predetermined angle and extend from all end face portions of the bottom surface portion in a direction of the image forming element, and is formed so that at least the bottom surface portion has a substantially uniform small thickness;

a vibrating member disposed in one of a position of the dust-screening member other than the light transmitting part of the bottom surface portion and a flat surface portion of the side wall portion, and configured to apply, to the bottom surface portion of the dust-screening member, a vibrational amplitude which is vertical to the bottom surface portion thereof; and a sealing structure portion configured to constitute a sealed space portion in a portion where both the image forming unit and the dust-screening member are formed to face each other.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a vertical side view of an image sensor element unit of the digital camera, which includes a dust removal mechanism (or a sectional view taken along line A-A shown in FIG. 2B);

FIG. 2B is a front view of the dust removal mechanism, as viewed from the lens side;

FIG. 3A is a perspective view showing a major component (vibrator) of the dust removal mechanism;

FIG. 3B is a sectional view of the major component, taken along line B-B shown in FIG. 3A;

FIG. 4A is a front view of a dust filter, explaining how the dust filter is vibrated;

FIG. 4B is a sectional view of the dust filter, taken along line B-B shown in FIG. 4A;

FIG. 4C is a sectional view of the dust filter, taken along line C-C shown in FIG. 4A;

FIG. 7 is a diagram showing another configuration the dust filter may have;

FIG. 8 is a diagram showing still another configuration the dust filter may have;

FIG. 11 is a conceptual diagram of the dust filter, explaining the standing wave that is produced in the dust filter;

FIG. 12 is a circuit diagram schematically showing the configuration of a dust filter control circuit;

FIG. 15 is a flowchart showing the operating sequence of "silent vibration" that is a subroutine shown in FIG. 14A;

FIG. 16 is a flowchart showing the operation sequence of the "display process" performed at the same time Step S201 of "silent vibration," i.e. subroutine (FIG. 15), is performed;

FIG. 17 is a flowchart showing the operating sequence of the "display process" performed at the same time Step S203 of "silent vibration," i.e., or subroutine (FIG. 15), is performed;

FIG. 18 is a flowchart showing the operating sequence of the "display process" performed at the same time Step S205 of "silent vibration," i.e., subroutine (FIG. 15), is performed;

DETAILED DESCRIPTION OF THE INVENTION

Figure 1:
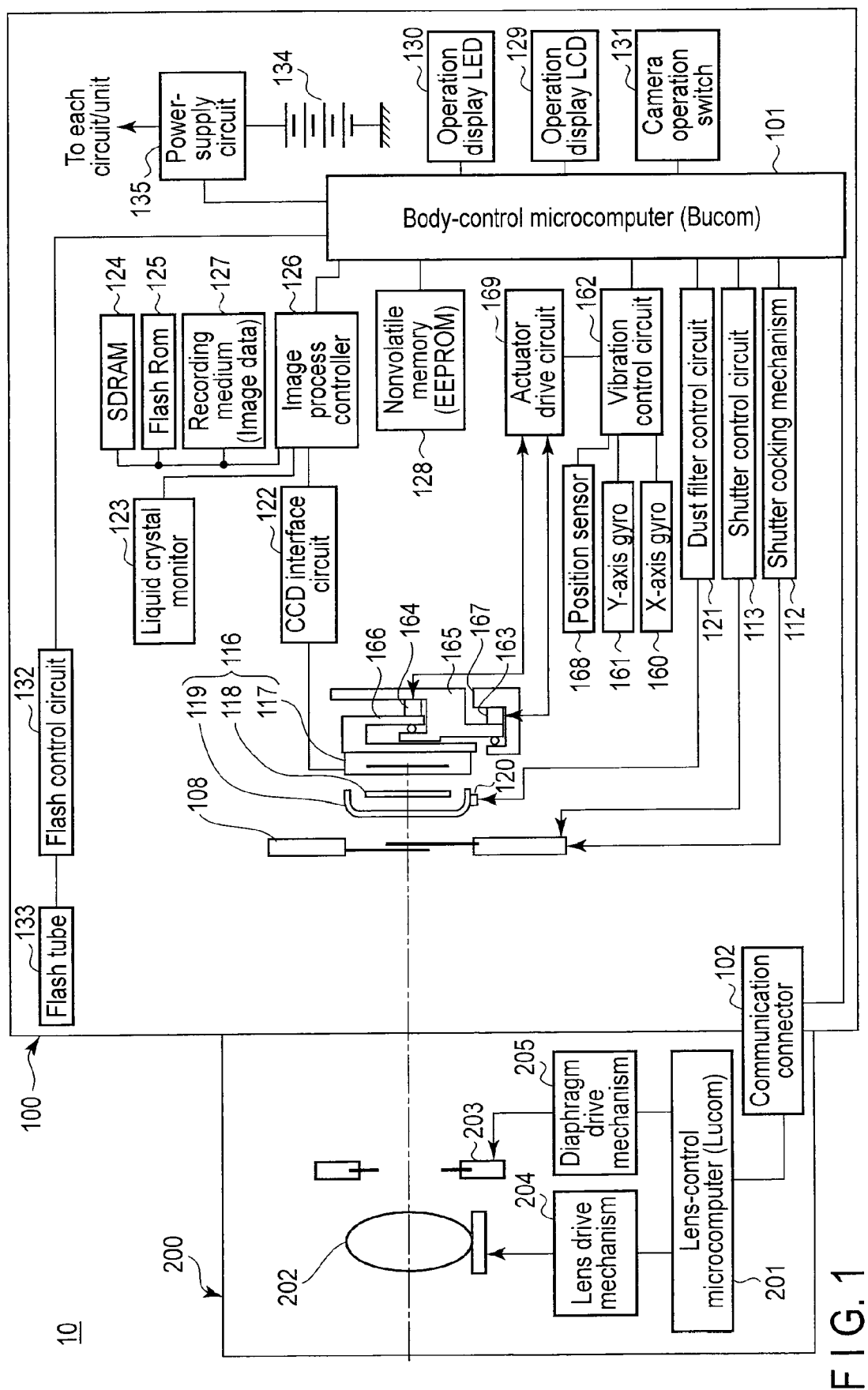
FIG. 1 is a block diagram schematically showing an exemplary system configuration, mainly electrical, of a lens-exchangeable, single-lens electronic camera (digital camera) that is a first embodiment of the image equipment according to this invention.

Best modes of practicing this invention will be described with reference to the accompanying drawings.

[First Embodiment]

An image equipment according to this invention, which will be exemplified below in detail, has a dust removal mechanism for the image sensor element unit that performs photoelectric conversion to produce an image signal. Here, a technique of improving the dust removal function of, for example, an electronic camera (hereinafter called "camera" will be explained. The first embodiment will be described, particularly in connection with a lens-exchangeable electronic camera (digital camera), with reference to FIGS. 1 to 2B.

First, the system configuration of a digital camera 10 according to this embodiment will be described with reference to FIG. 1. The digital camera 10 has a system configuration that comprises body unit 100 used as camera body, and a lens unit 200 used as an exchange lens, i.e., one of accessory devices.

The lens unit 200 can be attached to and detached from the body unit 100 via a lens mount (not shown) provided on the front of the body unit 100. The control of the lens unit 200 is performed by the lens-control microcomputer (hereinafter called "Lucom") 201 provided in the lens unit 200. The control of the body unit 100 is performed by the body-control microcomputer (hereinafter called "Bucom" 101 provided in the body unit 100. By a communication connector 102, the Lucom 210 and the Bucom 101 are electrically connected to each other, communicating with each other, while the lens unit 200 remains attached to the body unit 100. The Lucom 201 is configured to cooperate, as subordinate unit, with the Bucom 101.

The lens unit 200 further has a photographic lens 202, a diaphragm 203, a lens drive mechanism 204, and a diaphragm drive mechanism 205. The photographic lens 202 is driven by a stepping motor (not shown) that is provided in the lens drive mechanism 204. The diaphragm 203 is driven by a stepping motor (not shown) that is provided in the diaphragm drive mechanism 205. The Lucom 201 controls these motors in accordance with the instructions made by the Bucom 101.

In the body unit 100, a shutter 108, a shutter cocking mechanism 112, and a shutter control circuit 113 are arranged as shown in FIG. 1. The shutter 108 is a focal plane shutter arranged on the photographic optical axis. The shutter cocking mechanism 112 biases the spring (not shown) that drives the front curtain and rear curtain of the shutter 108. The shutter control circuit 113 controls the motions of the front curtain and rear curtain of the shutter 108.

In the body unit 100, an image acquisition unit 116 is further provided along a photographic optical axis to perform photoelectric conversion on the image of an object, which has passed through the above-mentioned optical system. The image acquisition unit 116 is constituted as a unit by integrating an image forming unit and a dust filter 119 which is a dust-screening member, via a holder 145. The image forming unit includes a CCD 117 that is an image sensor element as an image forming element, and an optical low-pass filter (LPF) 118 that is arranged in front of the CCD 117. Here, the optical low-pass filter (LPF) 118 is an optical element made of quartz crystal or the like. The dust filter 119 is an optical element made of quartz crystal, glass or the like, and may be made of a transparent plastic material. That is, the dust filter 119 may be a box-like transparent member which can be vibrated.

On one side of the circumferential edge of the dust filter 119, a piezoelectric element 120 is attached. The piezoelectric element 120 has two electrodes. A dust filter control circuit 121, which is a drive unit, drives the piezoelectric element 120 at the frequency determined by the size and material of the dust filter 119. As the piezoelectric element 120 vibrates, the dust filter 119 undergoes specific vibration. Dust can thereby be removed from the surface of the dust filter 119. To the image acquisition unit 116, an anti-vibration unit is attached to compensate for the motion of the hand holding the digital camera 10.

The digital camera 10 according to this embodiment further has a CCD interface circuit 122, a liquid crystal monitor 123, an SDRAM 124, a Flash ROM 125, and an image process controller 126, thereby to perform not only an electronic image acquisition function, but also an electronic record/display function. The electronic image acquisition function includes a so-called through image display function, which displays an image acquired by the CCD 117 as a moving image on the liquid crystal monitor 123, and uses it as a viewfinder, and a moving image recording function which records a moving image. As a viewfinder function, an optical single-lens reflex viewfinder or the like may be provided. The CCD interface circuit 122 is connected to the CCD 117. The SDRAM 124 and the Flash ROM 125 function as storage areas. The image process controller 126 uses the SDRAM 124 and the Flash ROM 125, to process image data. A recording medium 127 is removably connected by a communication connector (not shown) to the body unit 100 and can therefore communicate with the body unit 100. The recording medium 127 is an external recording medium, such as one of various memory cards or an external HDD, and records the image data acquired by photography. As another storage area, a nonvolatile memory 128, e.g., EEPROM, is provided and can be accessed from the Bucom 101. The nonvolatile memory 128 stores prescribed control parameters that are necessary for the camera control.

To the Bucom 101, there are connected an operation display LCD 129, an operation display LED 130, a camera operation switch 131, and a flash control circuit 132. The operation display LCD 129 and the operation display LED 130 display the operation state of the digital camera 10, informing the user of this operation state. The operation display LED 129 or the operation display LED 130 has, for example, a display unit configured to display the vibration state of the dust filter 119 as long as the dust filter control circuit 121 keeps operating. The camera operation switch 131 is a group of switches including, for example, a release switch, a mode changing switch, a power switch, which are necessary for the user to operate the digital camera 10. The flash control circuit 132 drives a flash tube 133.

In the body unit 100, a battery 134 used as power supply and a power-supply circuit 135 are further provided. The power-supply circuit 135 converts the voltage of the battery 134 to a voltage required in each circuit unit of the digital camera 10 and supplies the converted voltage to the each circuit unit. In the body unit 100, too, a voltage detecting circuit (not shown) is provided, which detects a voltage change at the time when a current is supplied from an external power supply though a jack (not shown).

The components of the digital camera 10 configured as described above operate as will be explained below. The image process controller 126 controls the CCD interface circuit 122 in accordance with the instructions coming from the Bucom 101, whereby image data is acquired from the CCD 117. The image data is converted to a video signal by the image process controller 126. The image represented by the video signal is displayed by the liquid crystal monitor 123. Viewing the image displayed on the liquid crystal monitor 123, the user can confirm the image photographed.

The SDRAM 124 is a memory for temporarily store the image data and is used as a work area in the process of converting the image data. The image data is held in the recording medium 127, for example, after it has been converted to JPEG data. Here, when image data is for a moving image, it is converted into MPEG data.

The photographic lens 202 is focused as follows. Images are acquired by sequentially changing the position of the photographic lens 202. Among the acquired images, a position with the highest contrast is calculated by the Bucom 101. This position is transmitted from the Bucom 101 to the Lucom 201 through the communication connector 102. The Lucom 201 controls the photographic lens 202 to this position. As for photometric measurement, know measurement is performed based on the amount of light detected from an acquired image.

The image acquisition unit 116 that includes the CCD 117 will be described with reference to FIGS. 2A and 2B. Note that the hatched parts shown in FIG. 2B show the shapes of members clearly, not to illustrating the sections thereof.

As described above, the image acquisition unit 116 has the CCD 117, the optical LPF 118, the dust filter 119, and the piezoelectric element 120. The CCD 117 is an image sensor element that produces an image signal that corresponds to the light applied to its photoelectric conversion surface through the photographic optical system. The optical LPF 118 is arranged at the photoelectric conversion surface of the CCD 117 and removes high-frequency components from the light beam coming from the object through the photographic optical system. The dust filter 119 is a box-like dust-screening member arranged in front of the optical LPF 118 and facing the optical LPF 118, spaced apart therefrom by a predetermined distance. The piezoelectric element 120 is arranged on a side wall portion of the box-like dust filter 119 and is a vibrating member for applying specific vibration to the dust filter 119.

The CCD chip 136 of the CCD 117 is mounted directly on a flexible substrate 137 that is arranged on a fixed plate 138. From the ends of the flexible substrate 137, connection parts 139a and 139b extend. Connectors 140a and 140b are provided on a main circuit board 141. The connection parts 139a and 139b are connected to the connectors 140a and 140b, whereby the flexible substrate 137 is connected to the main circuit board 141. The CCD 117 has a protection glass plate 142. The protection glass plate 142 is secured to the flexible substrate 137, with a spacer 143 interposed between it and the flexible substrate 137.

Between the CCD 117 and the optical LPF 118, a filter holding member 144 made of elastic material is arranged on the front circumferential edge of the CCD 117, at a position where it does not cover the effective area of the photoelectric conversion surface of the CCD 117. The filter holding member 144 abuts on the optical LPF 118, at a part close to the rear circumferential edge of the optical LPF 118. The filter holding member 144 functions as a sealing member that maintains the junction between the CCD 117 and the optical LPF 118 almost airtight. A holder 145 is provided, covering seals the CCD 117 and the optical LPF 118 in airtight fashion. The holder 145 has a rectangular opening 146 in a part that is substantially central around the photographic optical axis. The inner circumferential edge of the opening 146, which faces the dust filter 119, has a stepped part 147 having an L-shaped cross section. Into the opening 146, the optical LPF 118 and the CCD 117 are fitted from the back. In this case, the front circumferential edge of the optical LPF 118 contacts the stepped part 147 in a virtually airtight fashion. Thus, the optical LPF 118 is held by the stepped part 147 at a specific position in the direction of the photographic optical axis. The optical LPF 118 is therefore prevented from slipping forwards from the holder 145. The level of airtight sealing between the CCD 117 and the optical LPF 118 is sufficient to prevent dust from entering to form an image having shadows of dust particles. In other words, the sealing level need not be so high as to completely prevent the in-flow of gasses.

On the other hand, a front surface side of the holder 145 is provided with an opening which becomes an image forming light passing area 149. In a circumferential edge of the opening, a fitting portion 150 is formed over the whole periphery thereof. In the fitting portion 150, an inner peripheral wall of a holding member 151 made of a soft material such as a rubber fits. Around the whole periphery of the holding member 151, there is formed a groove 152 in which an open end of the thin box-like dust filter 119 fits. The box-like dust filter 119 fits in the groove 152 of the holding member 151, and is fixed thereto with an adhesive or the like. On the other hand, the holding member 151 is fixed to the holder 145 with the adhesive or the like, in the fitting portion 150 of the holder 145 or the surface of the holding member which is orthogonal to the fitting portion 150. When the open end of the box-like dust filter 119 is fixed to the holder 145 which is a fixing member via the soft holding member in this manner, the dust filter 119 is held in front of the optical LPF 118, spaced apart therefrom by the predetermined distance. It is to be noted that the open end of the dust filter 119 may directly be attached to the holder 145 with the adhesive or the like, instead of employing such a fixing process.

The holding member 151 is made of a vibration attenuating material such as a rubber or a resin, not to impede the vibration of the dust filter 119. Moreover, a space formed by the dust filter 119 and the LPF 118 is sealed from dust by the holding member 151, and hence such dust that forms an image having shadows of dust particles does not enter this space from the outside. Moreover, when a micro droplet, or adhesive dust which cannot remarkably easily be removed by the vibration adheres to the surface of the dust filter 119 on a photographic lens side, a cleaning operation by wiping is required. Even in such a case, the dust filter 119 with the box shape has a sufficient rigidity and does not break down, even when an external force is applied thereto during the cleaning operation. The holder 145 formed in a desired size to mount the CCD 117 as an image forming element thereon, the fitting portion 150, and the filter holding member 144 which airtightly holds betweenness of the CCD 117 and the optical LPF 118 constitute a sealing structure to seal at the circumferential edges of the CCD 117 and dust filter 119. The image acquisition unit 116 is configured, so that the area formed by the opposing CCD 117 and dust filter 119 is airtight by the above sealing structure. The level of airtight sealing between the dust filter 119 and the fitting portion 150 is sufficient to prevent dust from entering to form an image having the shadows of dust particles, so that the image can be prevented from being influenced by the dust. The sealing level need not be so high as to completely prevent the in-flow of gasses.

To the end of the piezoelectric element 120, which is vibrating member, flex 157, i.e., flexible printed board, is electrically connected. The flex 157 inputs an electric signal (later described) from the dust filter control circuit 121 to the piezoelectric element 120, causing the element 120 to vibrate in a specific way. The flex 157 is made of resin and cupper etc., and has flexibility. Therefore, the flex 157 little attenuates the vibration of the piezoelectric element 120. The flex 157 is provided at position where the vibrational amplitude is small (at the nodes of vibration, which will be described later), and can therefore suppress the attenuation of vibration. The piezoelectric element 120 moves relative to the body unit 100 if the camera 10 has such a hand-motion compensating mechanism as will be later described. Hence, if the dust filter control circuit 121 is held by a holding member formed integral with the body unit 100, the flex 157 is deformed and displaced as the hand-motion compensating mechanism operates. In this case, the flex 157 effectively works because it is thin and flexible. In the present embodiment, the flex 157 has a simple configuration, extending from one position. It is best fit for use in cameras having a hand-motion compensating mechanism.

The dust removed from the surface of the dust filter 119 falls onto the bottom of the body unit 100, by virtue of the vibration inertia and the gravity. In this embodiment, a base 158 is arranged right below the dust filter 119, and a holding member 159 made of, for example, adhesive tape, is provided on the base 158. The holding member 159 reliably traps the dust fallen from the dust filter 119, preventing the dust from moving back to the surface of the dust filter 119.

The hand-motion compensating mechanism will be explained in brief. As shown in FIG. 1, the hand-motion compensating mechanism is composed of an X-axis gyro 160, a Y-axis gyro 161, a vibration control circuit 162, an X-axis actuator 163, a Y-axis actuator 164, an X-frame 165, a Y-frame 166 (holder 145), a frame 167, a position sensor 168, and an actuator drive circuit 169. The X-axis gyro 160 detects the angular velocity of the camera when the camera moves, rotating around the X axis. The Y-axis gyro 161 detects the angular velocity of the camera when the camera rotates around the Y axis. The vibration control circuit 162 calculates a value by which to compensate the hand motion, from the angular-velocity signals output from the X-axis gyro 160 and Y-axis gyro 161. In accordance with the hand-motion compensating value thus calculated, the actuator drive circuit 169 moves the CCD 117 in the X-axis direction and Y-axis direction, which are first and second directions orthogonal to each other in the XY plane that is perpendicular to the photographic optical axis, thereby to compensate the hand motion, if the photographic optical axis is taken as Z axis. More precisely, the X-axis actuator 163 drives the X-frame 165 in the X-axis direction upon receiving a drive signal from the actuator drive circuit 169, and the Y-axis actuator 164 drives the Y-frame 166 in the Y-axis direction upon receiving a drive signal from the actuator drive circuit 169. That is, the X-axis actuator 163 and the Y-axis actuator 164 are used as drive sources, the X-frame 165 and the Y-frame 166 (holder 145) which holds the CCD 117 of the image acquisition unit 116 are used as objects that are moved with respect to the frame 167. Note that the X-axis actuator 163 and the Y-axis actuator 164 are each composed of an electromagnetic motor, a feed screw mechanism, and the like. Alternatively, each actuator may be a linear motor using a voice coil motor, a linear piezoelectric motor or the like. The position sensor 168 detects the position of the X-frame 165 and the position of the Y-frame 166. On the basis of the positions the position sensor 168 have detected, the vibration control circuit 162 controls the actuator drive circuit 169, which drives the X-axis actuator 163 and the Y-axis actuator 164. The position of the CCD 117 is thereby controlled.

The dust removal mechanism of the first embodiment will be described in detail, with reference to FIGS. 3A to 11. The dust filter 119 has a thin box shape. A bottom surface portion 119a of the box has a shape surrounded by a curve including a circle, or a polygonal plate-like shape as a whole (a square plate, in this embodiment). Moreover, in the bottom surface portion 119a of the dust filter 119, at least, the area spreading as prescribed from the position obtaining a maximum vibrational amplitude to the radial direction forms a light transmitting part. Alternatively, the bottom surface portion 119a of the dust filter 119 has a circular shape as a whole, and may be D-shaped, formed by linearly cutting part of a circular plate, thus defining one side. Still alternatively, it may be formed in an oval shape by cutting a square plate, having two opposite sides accurately cut and having upper and lower sides. In this manner, the shape may be a combination of curves and straight lines. Moreover, the dust filter 119 has side wall portions 119b which tilt as much as a predetermined angle and extend from all end face portions of the bottom surface portion 119a in a direction of the image forming element. The bottom surface portion 119a and the side wall portions 119b form the box-like dust filter 119 in the box shape in which the bottom surface portion 119a and the side wall portions 119b have a substantially uniform thickness. The above-mentioned fastening mechanism (a fastening process via the holding member 151 or a process of directly fastening the dust filter 119 to the holder 145 which is the fixing member with the adhesive or the like) fastens the dust filter 119, with the light transmitting part opposed to the front of the LPF 118 and spaced from the LPF 118 by a predetermined distance. Here, both the bottom surface portion 119a and the side wall portions 119b of the box-like dust filter 119 may have a uniformly small thickness, or at least the bottom surface portion 119a may have the uniformly small thickness.

Moreover, in a flat surface portion of the bottom surface portion 119a of the dust filter 119 at a position other than the image forming light passing area 149 or in a flat surface portion of the side wall portion 119b (the lower side wall portion 119b in the present embodiment), the piezoelectric element 120 is disposed by means of, for example, adhesion using the adhesive, or the like. The piezoelectric element 120 is the vibrating member for applying the vibration to the bottom surface portion 119a of the dust filter 119. In consequence, a vibrator 170 is formed by arranging the piezoelectric element 120 on the dust filter 119. The vibrator 170 undergoes resonance when a voltage of a prescribed frequency is applied to the piezoelectric element 120. The resonance achieves such bending vibration of a large amplitude vertically to the bottom surface portion 119a, as illustrated in FIG. 4A to FIG. 4C.

Here, an angle formed by the each side wall portion 119b and the bottom surface portion 119a constituting the dust filter 119 is preferably 90° or more, when the integral forming of the side wall portion 119b and the bottom surface portion 119a is taken into consideration. Moreover, when the enlargement of a projected area and the rigidity are taken into consideration, the angle is preferably set to be about 135° or less. Furthermore, when a surface connecting the bottom surface portion 119a to the side wall portion 119b is constituted of a surface which is approximate to a cylindrical surface as shown in FIG. 3A and FIG. 3B, the rigidity of the dust filter 119 becomes higher, and the dust filter 119 can be miniaturized. Furthermore, in the present embodiment, the bottom surface portion 119a and the side wall portions 119b of the dust filter 119 are integrally formed, but the portions may be constituted of separate members joined to each other. On the other hand, only one piezoelectric element 120 is disposed in FIG. 3A and FIG. 3B, but a plurality of piezoelectric elements may be arranged. Moreover, the piezoelectric element 120 may be disposed on an inner surface of the dust filter 119 (the surface on an image acquisition element side).

As shown in FIG. 3A, signal electrodes 171 and 172 are formed on the piezoelectric element 120. Note that the hatched parts shown in FIG. 3A show the shapes of the signal electrodes clearly, not to illustrating the sections thereof. The signal electrode 172 is provided on the back opposing the signal electrode 171, and is bent toward that surface of the piezoelectric element 120, on which the signal electrode 171 is provided, along the side wall portion of the piezoelectric element 120. The flex 157 having the above-mentioned conductive pattern is electrically connected to the signal electrode 171 and signal electrode 172. To the signal electrodes 171 and 172, a drive voltage of the prescribed frequency is applied form the dust filter control circuit 121 through flex 157. The drive voltage, thus applied, can cause the dust filter 119 to undergo such a two-dimensional, standing-wave bending vibration as is shown in FIGS. 4A to 4C. The side wall portion 119b of the dust filter 119 has a long side length LA, and a short side length LB orthogonal to the long side. (This size notation accords with the size notation used in FIGS. 7 to 10.) Since the dust filter 119 shown in FIG. 4A is rectangular, it is identical in shape to the "virtual rectangle" according to this invention (described later). (The long side length LA is equal to the side length LF of the virtual rectangle). The bending vibration shown in FIG. 4A is standing wave vibration. In FIG. 4A, the blacker the streaks, each indicating a node area 173 of vibration (i.e., area where the vibrational amplitude is small), the smaller the vibrational amplitude is. Note that the meshes shown in FIG. 4A are division meshes usually used in the final element method.

If the node areas 173 are at short intervals as shown in FIG. 4A when the vibration speed is high, in-plane vibration (vibration along the surface) will occur in the node areas 173. This vibration induces a large inertial force in the direction of the in-plane vibration (see mass point Y2 in FIG. 11, described later, which moves over the node along an arc around the node, between positions Y2 and Y2') to the dust at the node areas 173. If the dust filter 119 is inclined to become parallel to the gravity so that a force may act along the dust receiving surface, the inertial force and the gravity can remove the dust from the node areas 173.

In FIG. 4A, the white areas indicate areas where the vibrational amplitude is large. The dust adhering to any white area is removed by the inertial force exerted by the vibration. The dust adhering to a node area 173 of the vibration can be removed, when an electric signal having a different frequency is input into the piezoelectric element 120 to produce vibration in another vibration mode with another vibrational amplitude in the node area 173 (e.g. a vibrational mode shown in FIG. 5).

Figure 6:
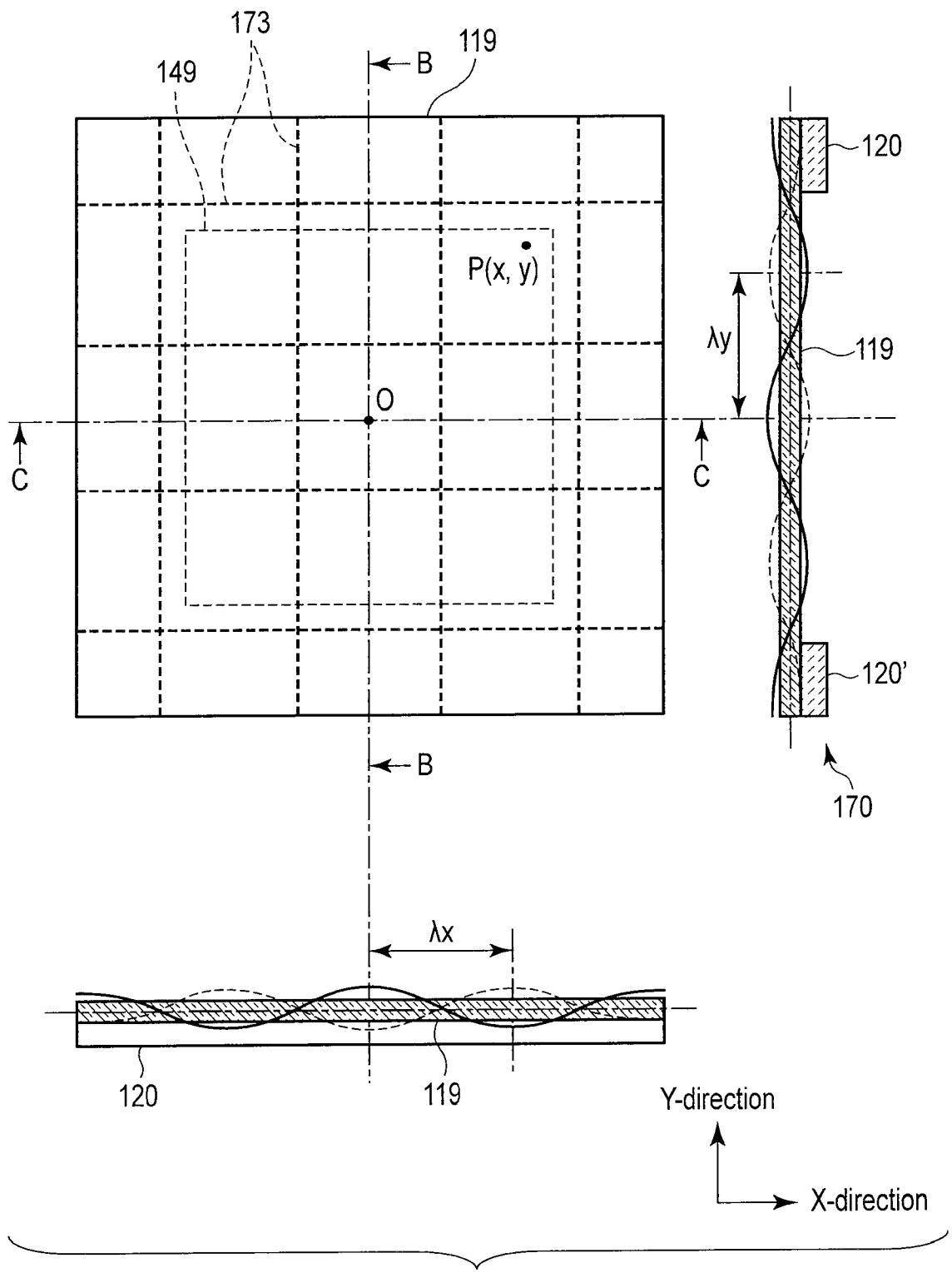
FIG. 6 is a diagram explaining the concept of vibrating the dust filter.

The bending vibrational mode shown in FIG. 4A is achieved by synthesizing the bending vibration of the X-direction and the bending vibration of the Y-direction. The fundamental state of this synthesis is shown in FIG. 6. By placing the vibrator 170, which has two piezoelectric elements 120 and 120' arranged symmetric to the central axis X of the dust filter 119, on a member that little attenuates vibration, such as a foamed rubber block, and then made to vibrate freely, a vibrational mode of producing such lattice-shaped node areas 173 as shown in FIG. 6 will be usually attained easily (see Jpn. Pat. Appln. KOKAI Publication No. 2007-228246, identified above). In the front view of FIG. 6, the broken lines define the node areas 173 (more precisely, the lines indicate the positions where the vibrational amplitude is minimal in the widthwise direction of lines). In this case, a standing wave, bending vibration at wavelength $\lambda_x$ occurs in the X-direction, and a standing wave, bending vibration at wavelength $\lambda_y$ occurs in the Y-direction. These standing waves are synthesized. With respect to the origin (x=0, y=0), the vibration Z (x, y) at a given point P (x, y) is expressed by Equation 1, as follows:

$$Z(x,y)=A \cdot W_{mn}(x,y) \cdot \cos(\gamma) + A \cdot W_{nm}(x,y) \cdot \sin(\gamma) \qquad (1)$$

where A is amplitude (a fixed value here, but actually changing with the vibrational mode or the power supplied to the piezoelectric elements); m and n are positive integers including 0, indicating the order of natural vibration corresponding to the vibrational mode; $\gamma$ is a given phase angle;

$$W_{mn}(x, y) = \sin\left(n\pi \cdot x + \frac{\pi}{2}\right) \cdot \sin\left(m\pi \cdot y + \frac{\pi}{2}\right);$$

and $$W_{nm}(x, y) = \sin\left(m\pi \cdot x + \frac{\pi}{2}\right) \cdot \sin\left(n\pi \cdot y + \frac{\pi}{2}\right).$$

Assume that the phase angle $\gamma$ is 0 ($\gamma=0$). Then, Equation 1 changes to:

$$Z(x, y) = A \cdot W_{mn}(x, y)$$
$$= A \cdot \sin\left(\frac{n \cdot \pi \cdot x}{\lambda_x} + \frac{\pi}{2}\right) \cdot \sin\left(\frac{m \cdot \pi \cdot y}{\lambda_y} + \frac{\pi}{2}\right).$$

Further assume that $\lambda_x=\lambda_y=\lambda=1$ (x and y are represented by the unit of the wavelength of bending vibration). Then:

$$Z(x, y) = A \cdot W_{mn}(x, y)$$
$$= A \cdot \sin\left(n \cdot \pi \cdot x + \frac{\pi}{2}\right) \cdot \sin\left(m \cdot \pi \cdot y + \frac{\pi}{2}\right).$$

FIG. 6 shows the vibrational mode that is applied if m=n (since the X-direction vibration and the Y-direction vibration are identical in terms of order and wavelength, the dust filter 119 has a square shape). In this vibrational mode, the peaks, nodes and valleys of vibration appear at regular intervals in both the X-direction and the Y-direction, and vibration node areas 173 appear as a checkerboard pattern (conventional vibrational mode). In the vibrational mode where m=0, n=1, the vibration has peaks, nodes and valleys parallel to a side (side LB) that extends parallel to the Y-direction. In the vibrational mode identified with a checkerboard pattern or peaks, nodes and valleys parallel to a side, the X-direction vibration and the Y-direction vibration remain independent, never synthesized to increase the vibrational amplitude.

Here, if the dust filter 119 is shaped a little close to a rectangle, a vibrational mode with a very large vibrational amplitude can be obtained, even if a piezoelectric element is placed along one side as in this embodiment. (The maximum amplitude at the same level as at the conventional circular dust filter is generated.) At this time, the vibrational mode will be the mode shown in FIG. 4A is obtained. In this vibrational mode, though the dust filter 119 is rectangular, the peak ridges 174 of vibrational amplitude form closed loops (substantially circular in FIG. 4A) around the center of the optical axis. Consequently, a reflected wave coming from a side extending in the X-direction and a reflected wave coming from a side extending in the Y-direction are efficiently combined, forming a standing wave. Here, the dust filter 119 has at least one side symmetric to the virtual axis passing through the centroid 119c, and the piezoelectric element 120 is disposed so that a centroid of the piezoelectric element 120 is located on the virtual axis. The center of the closed loop formed by the peak ridges 174 of vibrational amplitude becomes a central vibrating area 175 having maximum vibration speed and vibrational amplitude. The centroid 175*a* of the central vibrating area 175 and the centroid 173*a* of an area surrounded by the node area 173 having almost no vertical vibrational amplitude against the surface formed in the bottom surface portion 119*a* of the dust filter 119, including the centroid 175*a* of the central vibrating area 175, are substantially identical and similarly located on the above virtual axis. However, since only one piezoelectric element 120 is disposed, the centroid 175*a* of the central vibrating area 175 is displaced from the centroid 119*c* of the dust filter 119 to a side provided with the piezoelectric element 120.

Here, the centroid of the piezoelectric element 120 does not expand or contract, even if a driving voltage is applied, and hence the piezoelectric element 120 is preferably attached so that the centroid thereof is positioned in the node area. On the other hand, since the side wall portion 119*b* of the dust filter 119 extends in a direction of the amplitude of the generated vibration, a boundary portion between the bottom surface portion 119*a* and the side wall portion 119*b* on the above virtual axis does not vibrate but forms the node area 173. Therefore, the piezoelectric element 120 has the centroid thereof disposed in the above boundary portion on the above virtual axis. In this case, when the piezoelectric element 120 is disposed on the bottom surface portion 119*a* of the dust filter 119, the position of the centroid becomes a position where the vibrational amplitude becomes large to a certain degree, even if the element is disposed along a long side in the above boundary portion. This is because the piezoelectric element 120 has a certain degree of dimension in a short side direction thereof. On the other hand, when the piezoelectric element 120 is disposed on the side wall portion 119*b* of the dust filter 119, the position of the centroid preferably substantially corresponds to the above boundary portion, because the piezoelectric element 120 has a small dimension in a thickness direction.

Moreover, in a case where the open end of the dust filter 119 is an end of the bottom surface portion as shown in FIG. 6 and only one piezoelectric element 120 is disposed, even when the peak ridges 174 of the vibrational amplitude draws a concentric circle, a perfect circular shape cannot easily be obtained. This is because a symmetric shape is not easily obtained and reflecting conditions are not well set. On the other hand, in the box-like dust filter 119 shown in FIG. 4A to FIG. 4C, the perfect circular shape is drawn. This is because the boundary portions between the bottom surface portion 119*a* and the side wall portion 119*b* on the above virtual axis and a virtual axis which is orthogonal to this virtual axis form the node areas 173.

The dust filter 119 of the vibrator 170, shown in FIGS. 4A to 4C, is a glass plate (optical element) having a size of 25.0 mm (X-direction: LA, LF)×24.2 mm (Y-direction: LB)×4.2 mm (Z-direction: H) and a uniform thickness of 0.2 mm. The dust filter 119 is rectangular, having long sides LA (25.0 mm, extending in the X-direction) and short sides LB (24.2 mm). Therefore, the bottom surface portion 119*a* of the dust filter 119 is identical to the "virtual rectangle" according to this invention, which has the same area as a member surface of the bottom surface portion. The piezoelectric element 120 is made of a lead titanate-zirconate ceramic and has a size of 16.6 mm (X-direction)×2.4 mm (Y-direction)×0.6 mm (thickness).

The piezoelectric element 120 is adhered with epoxy-based adhesive to the dust filter 119, extending along the lower side wall portion 119*b*. More specifically, the piezoelectric element 120 extends in the X-direction, and arranged symmetric in the Z-direction, with respect to an axis which is parallel to the X-axis passing through the center of the lower side wall portion of the dust filter 119 and an axis which is parallel to the Z-axis. At this time, the resonance frequency in the vibrational mode of FIG. 4A is in the vicinity of 44 kHz. At the center of the dust filter 119, the central vibrating area 175 having maximal vibration speed and vibrational amplitude can be attained if the dust filter is shaped like a circle in which the rectangular dust filter 119 is inscribed.

Figure 5:
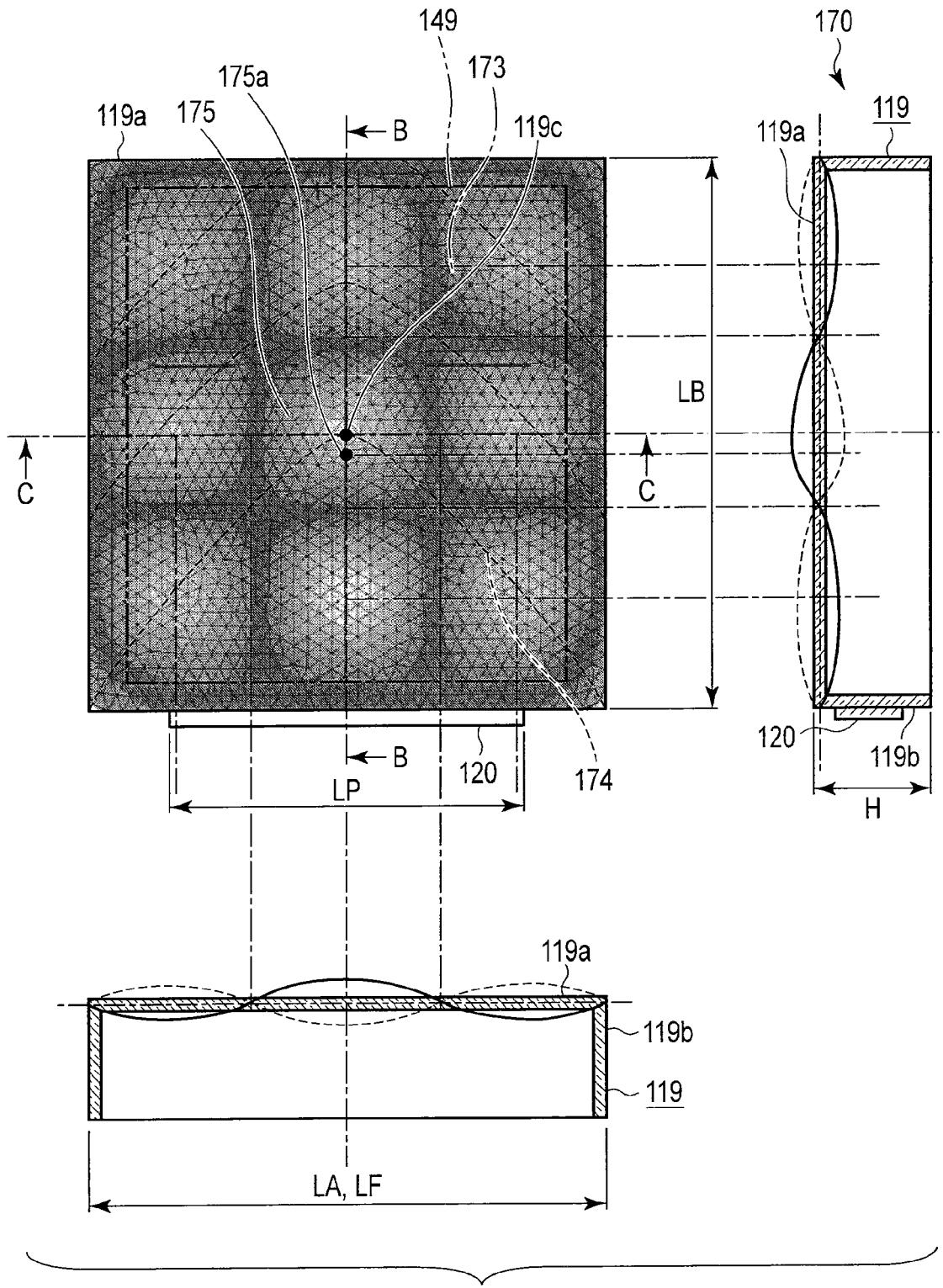
FIG. 5 is a diagram explaining how the dust filter is vibrated in another mode.

Moreover, a vibrational mode of FIG. 5 is a mode generated by changing a vibrating frequency of the dust filter 119 shown in FIG. 4A to FIG. 4C. In this vibrational mode, the peak ridges 174 of the vibrational amplitude continuously positioned substantially in the form of concentric circles are formed from one side to the other side disposed to face the one side symmetrically to a certain virtual axis passing through the centroid 119*c* of the dust filter 119. Here, the center of each of the peak ridges 174 substantially having the continuously concentric circle shapes is located on the above virtual axis on a side opposite to the above other side via the above one side of the dust filter 119.

FIG. 7 shows a modification of the vibrator 170. The modified vibrator uses a bottom surface portion 119*a* of a dust filter 119 having a shape formed by cutting a part of a plate shaped like a disc, thus defining one side. That is, the modified vibrator 170 uses a D-shaped bottom surface portion 119*a* of the dust filter 119 that has a side symmetric with respect to the symmetry axis extending in the Y-direction. The piezoelectric element 120 is arranged on the surface of the dust filter 119, extending parallel to that side and positioned symmetric with respect to the midpoint of the side (or to a symmetry axis extending in the Y-direction (the virtual axis)), in the same manner as in the conventional plate-like dust filter (see FIG. 6). So shaped, the dust filter 119 is more symmetric with respect to its center (regarded as the centroid 119*c* of the dust filter 119), and can more readily vibrate in a state desirable to the present embodiment (the vibrational mode in which the vibration peak is generated in the form of the concentric circle). In addition, the dust filter 119 can be smaller than the circular one. Furthermore, since the piezoelectric element 120 is arranged parallel to the side, the asymmetry in terms vibration, resulting from the cutting, can be made more symmetric by increasing the rigidity. This helps to render the vibration state more desirable. Note that the long side and short side of the dust filter 119 shown in FIG. 7 are as follows. As shown in the drawing, one of the long sides includes the above one side of the bottom surface portion 119*a* of the dust filter 119, and the other long side facing the above one side is parallel to the above one side, and is one side of the virtual rectangle 176 which has the same area as the bottom surface portion 119*a* of the dust filter 119. The each short side orthogonal to these sides is a side of the virtual rectangle 176 which has the same area as the bottom surface portion 119*a* of the dust filter 119. It is to be noted that also in the present modification, the piezoelectric element 120 may, needless to say, be disposed on the side wall portion of the box-like dust filter 119 more preferably as described above.

FIG. 8 shows another modification of the vibrator 170. This modified vibrator uses a bottom surface portion 119*a* of a dust filter 119 having an oval shape formed by symmetrically cutting a circular plate along two parallel lines, forming two parallel sides. That is, the modified vibrator 170 uses a dust filter 119 that has two sides symmetric with respect to the symmetry axis extending in the Y-direction. In this case, actuate piezoelectric element 120 is arranged not on the straight sides, but on the curved parts defining a circle. In such a configuration, the piezoelectric element 120 is arranged, efficiently providing a smaller vibrator 170. Note that the long side and short side of the dust filter 119 shown in FIG. 8 are the long and short sides of a virtual rectangle 176 which has the same area as the bottom surface portion 119a of the dust filter 119, two opposite sides of which extend along the opposite two sides of bottom surface portion 119a of the dust filter 119, respectively. It is to be noted that also in the present modification, the piezoelectric element 120 may, needless to say, be disposed on the side wall portion of the box-like dust filter 119 more preferably as described above.

Figure 9:
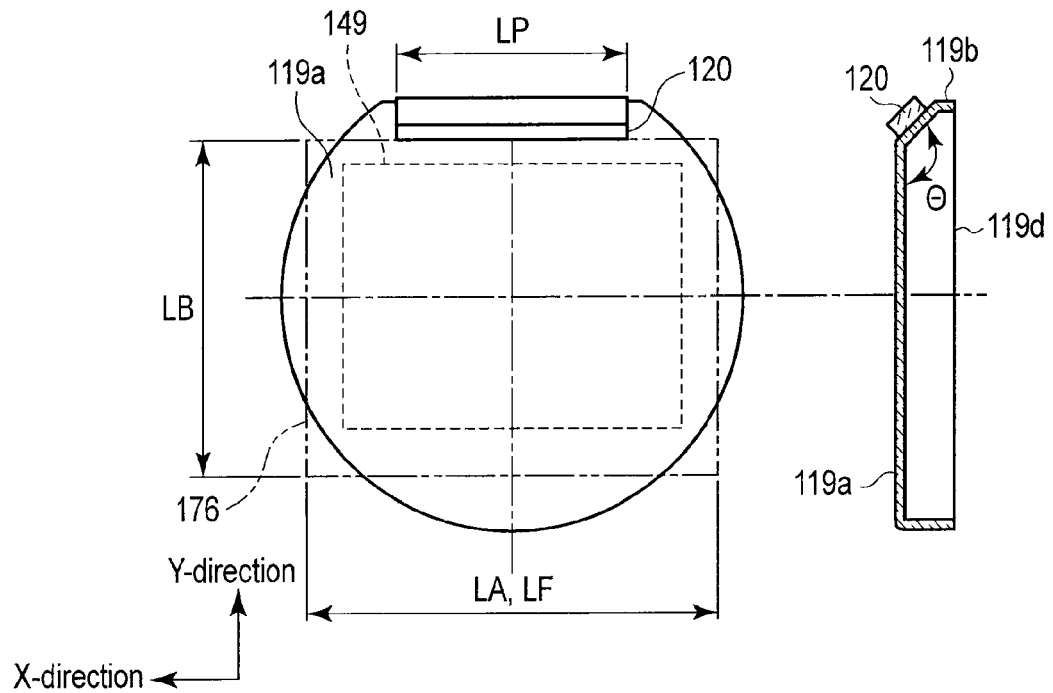
FIG. 9 is a diagram showing another configuration the dust filter may have.

FIG. 9 shows still another modification of the vibrator 170. In the same manner as in the modification shown in FIG. 7, a shape of a bottom surface portion 119a of a dust filter 119 has one side formed by cutting part of a disc-like shape. Additionally, in the present modification, a piezoelectric element 120 is disposed on a side wall portion 119b of the dust filter 119 in parallel with one side symmetric with respect to a symmetry axis in a Y-direction, and symmetrically to a midpoint of the side (the symmetry axis in the Y-direction). Here, the surface of the dust filter 119 on which the piezoelectric element 120 is disposed has an angle θ of about 135° between the surface and the bottom surface portion 119a. When the dust filter 119 is formed in such a shape, symmetry of the shape of the dust filter 119 with respect to the center (this may be regarded as the centroid) of the dust filter becomes high, and a vibration state of the present embodiment (a vibrational mode in which a vibration peak is generated in the form of a concentric circle) is more easily formed, in the same manner as in the modification shown in FIG. 7. In addition, the shape of the dust filter 119 becomes smaller than a circular one. Furthermore, since the piezoelectric element 120 is disposed on the side wall portion 119b, the bottom surface portion 119a of the dust filter 119 is further miniaturized. Moreover, a rigidity of the side wall portion 119b of the dust filter 119 becomes high, and an open end 119d of the side wall portion 119b can securely held by a holding member 151 without being deformed. It is to be noted that in FIG. 9, the angle between the only one surface of the side wall portion 119b on which the piezoelectric element 120 is disposed and the bottom surface portion 119a is not the right angle, but an angle between each of the another side wall portions 119b and the bottom surface portion 119a of the dust filter is a right angle. The angle between the each of another cylindrical side wall portions 119b except the above one surface and the bottom surface portion 119a may be set to an angle of about 90° to 135°. When the angle is set to be larger than 90°, the shape of the dust filter gradually comes close to a disc shape, and hence the vibrational mode having a concentric peak is easily generated, whereby strong vibration having a higher vibration speed is easily generated. Furthermore, when the dust filter 119 is formed in a box-like shape, the rigidity thereof is raised. If the dust filter having a plate shape is not accurately supported, the dust filter might break down during the vibration. Therefore, a plate thickness, which has been set to be about 0.5 mm in the plate shape dust filter, can be set to 0.3 mm or less in the box-like shape dust filter. Consequently, since the thickness of the bottom surface portion 119a to be vibrated can be set to be small, the vibration speed can be set to be higher than that generated in the plate shape dust filter. On the other hand, the side wall portion 119b constituting the dust filter 119 has a high rigidity in a vibrating direction of the bottom surface portion 119a, and almost does not vibrate in the vibrating direction of the bottom surface portion 119a. Therefore, the open end 119d which becomes an attaching surface can securely be held by the holding member 151 without being deformed, whereby the dust filter 119 can securely be supported.

Figure 10:
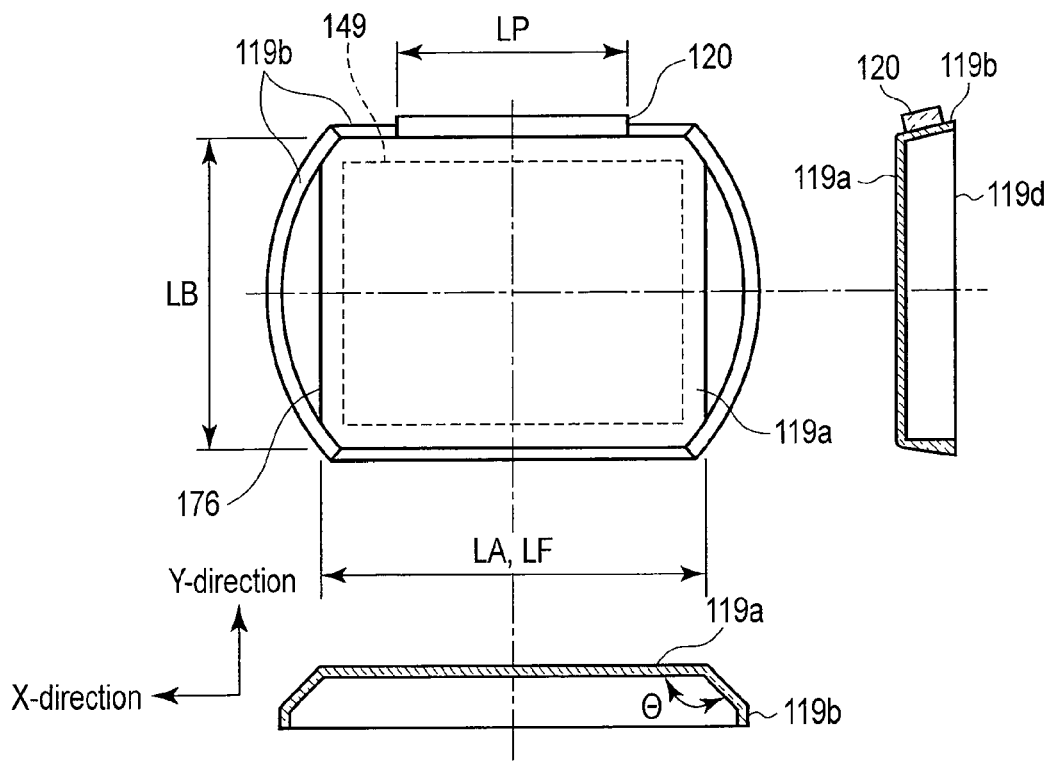
FIG. 10 is a diagram showing still another configuration the dust filter may have.

FIG. 10 shows a further modification of the vibrator 170. In the same manner as in the modification shown in FIG. 8, a bottom surface portion 119a of a dust filter 119 is formed into an oval shape by symmetrically cutting a disc to obtain two parallel sides. Moreover, the surface of the filter including two circles is provided with a slope having an angle of about 135° between the slope and the bottom surface portion 119a, and the filter is formed to be smaller than the dust filter 119 of FIG. 9. Furthermore, a thickness of the side wall portions 119b to be provided with an open end 119d smoothly increases from the bottom surface portion 119a, excluding the side wall portion 119b on which a piezoelectric element 120 is disposed. Since the thickness of the filter on the side of the open end is large, the fixing of the dust filter 119 is stabilized as compared with the dust filter 119 of FIG. 9. In this case, the piezoelectric element 120 is disposed on the upper side wall portion 119b of two side wall portions 119b continuously arranged along the above two sides. Here, the thickness of the side wall portion 119b provided with the piezoelectric element 120 is as small as that of the bottom surface portion 119a, and hence vibration generated in the piezoelectric element 120 is efficiently transmitted to the bottom surface portion 119a, whereby strong vibration having a high vibration speed can be generated in the bottom surface portion 119a. It is to be noted that here, short and long sides of a virtual rectangle 176 in FIG. 10 substantially correspond to short and long sides of the bottom surface portion 119a as shown in the drawing.

Note that it has been described that a material of the dust filter 119 is transparent glass, but the material may be a resin such as a methacrylic methyl resin or a polycarbonate resin. A resin or glass material which enables forming is optimum.

A method of removing dust will be explained in detail, with reference to FIG. 11. FIG. 11 shows a cross section identical to that shown in FIG. 4B. Assume that the piezoelectric element 120 is polarized in the direction of arrow 177 as shown in FIG. 11. If a voltage of a specific frequency is applied to the piezoelectric element 120 at a certain time t0, the vibrator 170 will be deformed as indicated by solid lines. At the mass point Y existing at given position y in the surface of the vibrator 170, the vibration z in the Z-direction is expressed by Equation 2, as follows:

$$z = A \cdot \sin(Y) \cdot \cos(\omega t) \quad (2)$$

where ω is the angular velocity of vibration, A is the amplitude of vibration in the Z-direction, and Y=2 πy/λ (λ: wavelength of bending vibration).

The Equation 2 represents the standing-wave vibration shown in FIG. 4A. Thus, if y=s·λ/2 (here, is an integer), then Y=sπ, and sin(Y)=0. Hence, a node 178, at which the amplitude of vibration in the Z-direction is zero irrespective of time, exists for every π/2. This is standing-wave vibration. The state indicated by broken lines in FIG. 11 takes place if t=kπ/ω (k is odd), where the vibration assumes a phase opposite to the phase at time $t_0$.

Vibration $z(Y_1)$ at point $Y_1$ on the dust filter 119 is located at an antinode 179 of standing wave, bending vibration. Hence, the vibration in the Z-direction has amplitude A, as expressed in Equation 3, as follows:

$$z(Y_1) = A \cdot \cos(\omega t) \quad (3)$$

If Equation 3 is differentiated with time, the vibration speed $Vz(Y_1)$ at point $Y_1$ is expressed by Equation 4, below, because ω=2πf, where f is the frequency of vibration:

$$Vz(Y_1) = \frac{d(z(Y_1))}{dt} = -2\pi f \cdot A \cdot \sin(\omega t) \quad (4)$$

If Equation 4 is differentiated with time, vibration acceleration $\alpha z(Y_1)$ is expressed by Equation 5, as follows:

$$\alpha z(Y_1) = \frac{d(Vz(Y_1))}{dt} = -4\pi^2 f^2 \cdot A \cdot \cos(\omega t) \quad (5)$$

Therefore, the dust 180 adhering at point $Y_1$ receives the acceleration of Equation 5. The inertial force Fk the dust 180 receives at this time is given by Equation 6, as follows:

$$Fk = \alpha z(Y_1) \cdot M = -4\pi^2 f^2 \cdot A \cdot \cos(\omega t) \cdot M \quad (6)$$

where M is the mass of the dust 180.

As can be seen from Equation 6, the inertial force Fk increases as frequency f is raised, in proportion to the square of f. However, the inertial force cannot be increased if amplitude A is small, no matter how much frequency f is raised. Generally, kinetic energy of vibration can be produced, but in a limited value, if the piezoelectric element 120 that produces the kinetic energy has the same size. Therefore, if the frequency is raise in the same vibrational mode, vibrational amplitude A will change in inverse proportion to the square of frequency f. Even if the resonance frequency is raised to achieve a higher-order resonance mode, the vibrational frequency will fall, not increasing the vibration speed or the vibration acceleration. Rather, if the frequency is raised, ideal resonance will hardly be accomplished, and the loss of vibrational energy will increase, inevitably decreasing the vibration acceleration. That is, the mode cannot attain large amplitude if the vibration is produced in a resonance mode that uses high frequency only. The dust removal efficiency will be much impaired.

Although the dust filter 119 is rectangular, the peak ridges 174 of vibrational amplitude form closed loops around the optical axis in the vibrational mode of the embodiment, which is shown in FIG. 4A. In the vibrational mode of the embodiment, which is shown in FIG. 5, the peak ridges 174 of vibrational amplitude form curves surrounding the midpoint of each side. The wave reflected from the side extending in the X-direction and the wave reflected from the side extending in the Y-direction are efficiently synthesized, forming a standing wave. On the other hand, in the vibrational mode of FIG. 4A, the maximum vibration speed around the center of the area which spreads from the center of the dust filter 119 and through which the object light passes is largest. In the vibrational mode of FIG. 5, the maximum vibration speed of the above center lowers from about 50% to 70% of that in the vibrational mode of FIG. 4A. Even in the vibrational mode of FIG. 5, however, the maximum vibration speed of the center is larger than that in the conventional rectangular flat plate.

In vibration wherein the peak ridges 174 of vibrational amplitude form closed loops around the optical axis or the peak ridges 174 form curves surrounding the midpoint of each side, the dust filter 119 can undergo vibration of amplitude a similar to that of concentric vibration that may occur if the dust filter 119 has a disc shape. In any vibrational mode in which the amplitude is simply parallel to the side, the vibration acceleration is only 10% or more of the acceleration achieved in this embodiment.

In the vibration wherein the peak ridges 174 of vibrational amplitude form closed loops or curves surrounding the midpoint of each side, the vibrational amplitude is the largest at the center of the vibrator 170 and small at the closed loop or the curve at circumferential edges. Thus, the dust removal capability is maximal at the center of the image. If the center of the vibrator 170 is aligned with the optical axis, the shadow of dust 180 will not appear in the center part of the image, which has high image quality. This is an advantage.

In the vibration node areas 173, which exist in the focusing-beam passing area 149, the nodes 178 may be changed in position by changing the drive frequencies of the piezoelectric element 120. Then, the element 120 resonates in a different vibrational mode, whereby the dust can be removed, of course.

The prescribed frequency at which to vibrate the piezoelectric element 120 is determined by the shape and dimensions of the dust filter 119 and piezoelectric element 120 forming the oscillator 170, and the materials and supported states of them. Therefore, it is desirable to measure the temperature of the vibrator 170 and to consider the change in the natural frequency of the vibrator 170, before the vibrator 170 is used. A temperature sensor (not shown) is therefore connected to a temperature measuring circuit (not shown), in the digital camera 10. The value by which to correct the vibrational frequency of the vibrator 170 in accordance with the temperature detected by the temperature sensor is stored in the nonvolatile memory 128. Then, the measured temperature and the correction value are read into the Bucom 101. The Bucom 101 calculates a drive frequency, which is used as drive frequency of the dust filter control circuit 121. Thus, vibration can be produced, which is efficient with respect to temperature changes, as well.

Figure 13:
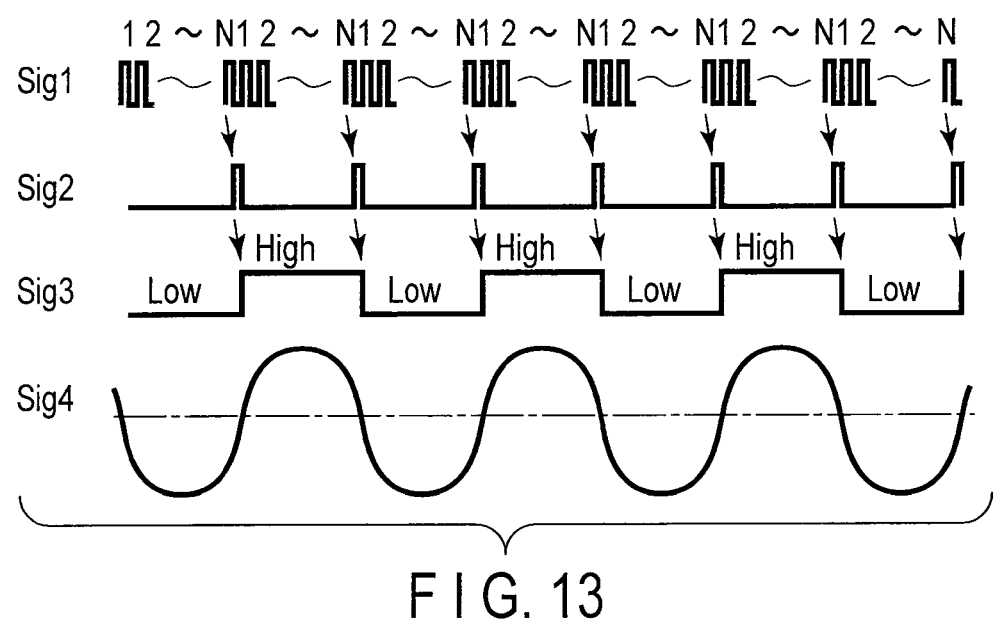
FIG. 13 is a timing chart showing the signals output from the components of the dust filter control circuit.

The dust filter control circuit 121 of the digital camera 10 according to this invention will be described below, with reference to FIGS. 12 and 13. The dust filter control circuit 121 has such a configuration as shown in FIG. 12. The components of the dust filter control circuit 121 produce signals (Sig1 to Sig4) of such waveforms as shown in the timing chart of FIG. 13. These signals will control the dust filter 119, as will be described below.

More specifically, as shown in FIG. 12, the dust filter control circuit 121 comprises a N-scale counter 183, a half-frequency dividing circuit 184, an inverter 185, a plurality of MOS transistors $Q_{00}$, $Q_{01}$ and $Q_{02}$, a transformer 186, and a resistor $R_{00}$.

The dust filter control circuit 121 is so configured that a signal (Sig4) of the prescribed frequency is produced at the secondary winding of the transformer 186 when MOS transistors $Q_{01}$ and $Q_{02}$ connected to the primary winding of the transformer 186 are turned on and off. The signal of the prescribed frequency drives the piezoelectric element 120, thereby causing the vibrator 170, to which the dust filter 119 is secured, to produce a resonance standing wave.

The Bucom 101 has two output ports P_PwCont and D_NCnt provided as control ports, and a clock generator 187. The output ports P_PwCont and D_NCnt and the clock generator 187 cooperate to control the dust filter control circuit 121 as follows. The clock generator 187 outputs a pulse signal (basic clock signal) having a frequency much higher than the frequency of the signal that will be supplied to the piezoelectric element 120. This output signal is signal Sig1 that has the waveform shown in the timing chart of FIG. 13. The basic clock signal is input to the N-scale counter 183.

The N-scale counter 183 counts the pulses of the pulse signal. Every time the count reaches a prescribed value "N," the N-scale counter 183 produces a count-end pulse signal. Thus, the basic clock signal is frequency-divided by N. The signal the N-scale counter 183 outputs is signal Sig2 that has the waveform shown in the timing chart of FIG. 13.

The pulse signal produced by means of frequency division does not have a duty ratio of 1:1. The pulse signal is supplied to the half-frequency dividing circuit 184. The half-frequency dividing circuit 184 changes the duty ratio of the pulse signal to 1:1. The pulse signal, thus changed in terms of duty ratio, corresponds to signal Sig3 that has the waveform shown in the timing chart of FIG. 13.

While the pulse signal, thus changed in duty ratio, is high, MOS transistor $Q_{01}$ to which this signal has been input is turned on. In the meantime, the pulse signal is supplied via the inverter 185 to MOS transistor $Q_{02}$. Therefore, while the pulse signal (signal Sig3) is low state, MOS transistor $Q_{02}$ to which this signal has been input is turned on. Thus, the transistors $Q_{01}$ and $Q_{02}$, both connected to the primary winding of the transformer 186, are alternately turned on. As a result, a signal Sig4 of such frequency as shown in FIG. 13 is produced in the secondary winding of the transformer 186.

The winding ratio of the transformer 186 is determined by the output voltage of the power-supply circuit 135 and the voltage needed to drive the piezoelectric element 120. Note that the resistor $R_{00}$ is provided to prevent an excessive current from flowing in the transformer 186.

In order to drive the piezoelectric element 120, MOS transistor $Q_{00}$ must be on, and a voltage must be applied from the power-supply circuit 135 to the center tap of the transformer 186. In this case, MOS transistor $Q_{00}$ is turned on or off via the output port P_PwCont of the Bucom 101. Value "N" can be set to the N-scale counter 183 from the output port D_NCnt of the Bucom 101. Thus, the Bucom 101 can change the drive frequency for the piezoelectric element 120, by appropriately controlling value "N."

The frequency can be calculated by using Equation 7, as follows:

$$fdrv = \frac{fpls}{2N} \quad (7)$$

where N is the value set to the N-scale counter 183, fpls is the frequency of the pulse output from the clock generator 187, and fdrv is the frequency of the signal supplied to the piezoelectric element 120.

The calculation based on Equation 7 is performed by the CPU (control unit) of the Bucom 101.

If the dust filter 119 is vibrated at a frequency in the ultrasonic region (i.e., 20 kHz or more), the operating state of the dust filter 119 cannot be aurally discriminated, because most people cannot hear sound falling outside the range of about 20 to 20,000 Hz. This is why the operation display LCD 129 or the operation display LED 130 has a display unit for showing how the dust filter 119 is operating, to the operator of the digital camera 10. More precisely, in the digital camera 10, the vibrating members (piezoelectric element 120) imparts vibration to the dust-screening member (dust filter 119) that is arranged in front of the CCD 117, can be vibrated and can transmit light. In the digital camera 10, the display unit is operated in interlock with the vibrating member drive circuit (i.e., dust filter control circuit 121), thus informing how the dust filter 119 is operating (later described in detail).

Figure 14A:
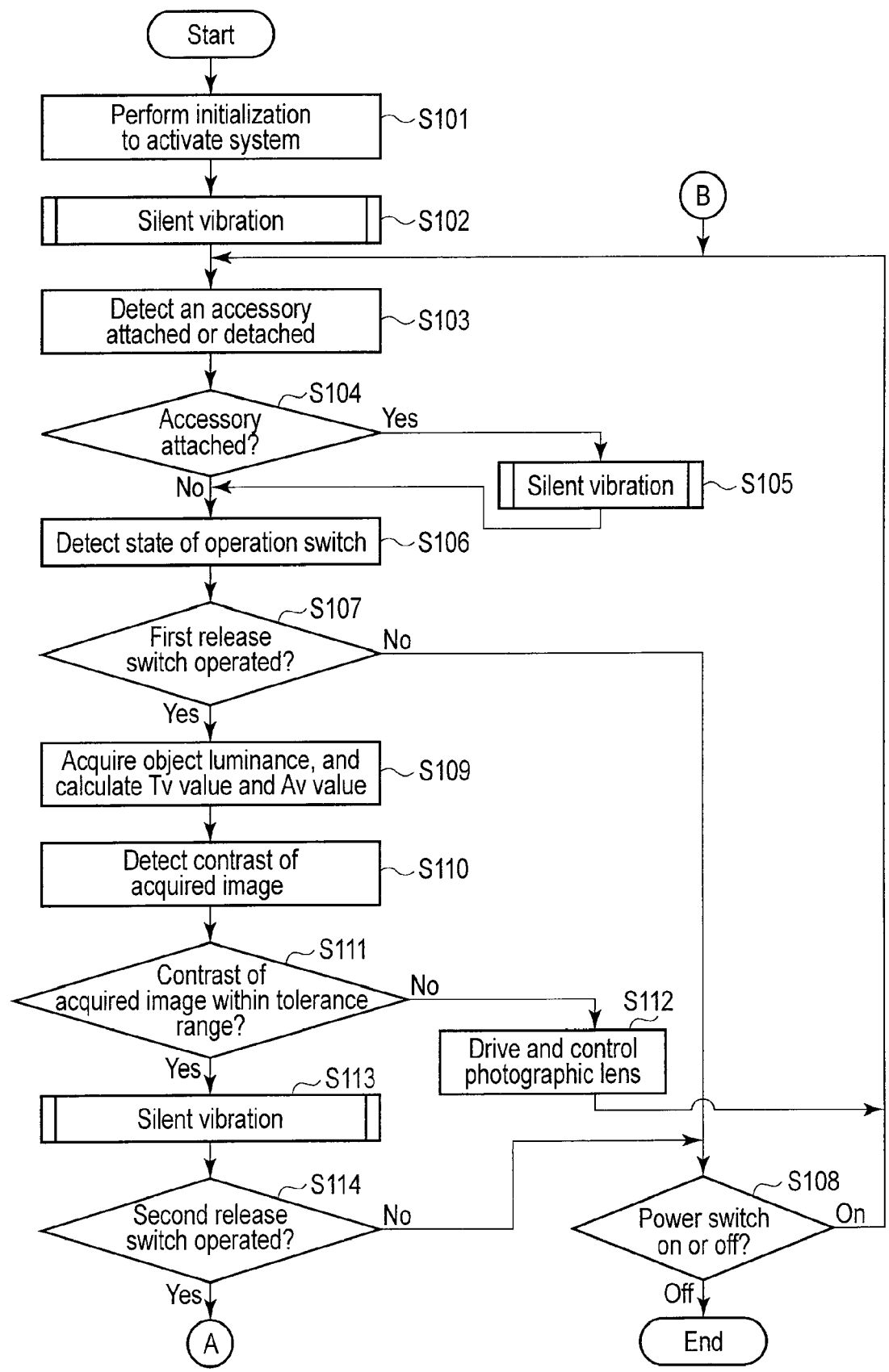
FIG. 14A is the first part of a flowchart showing an exemplary camera sequence (main routine) performed by the microcomputer for controlling the digital camera body according to the first embodiment.
Figure 14B:
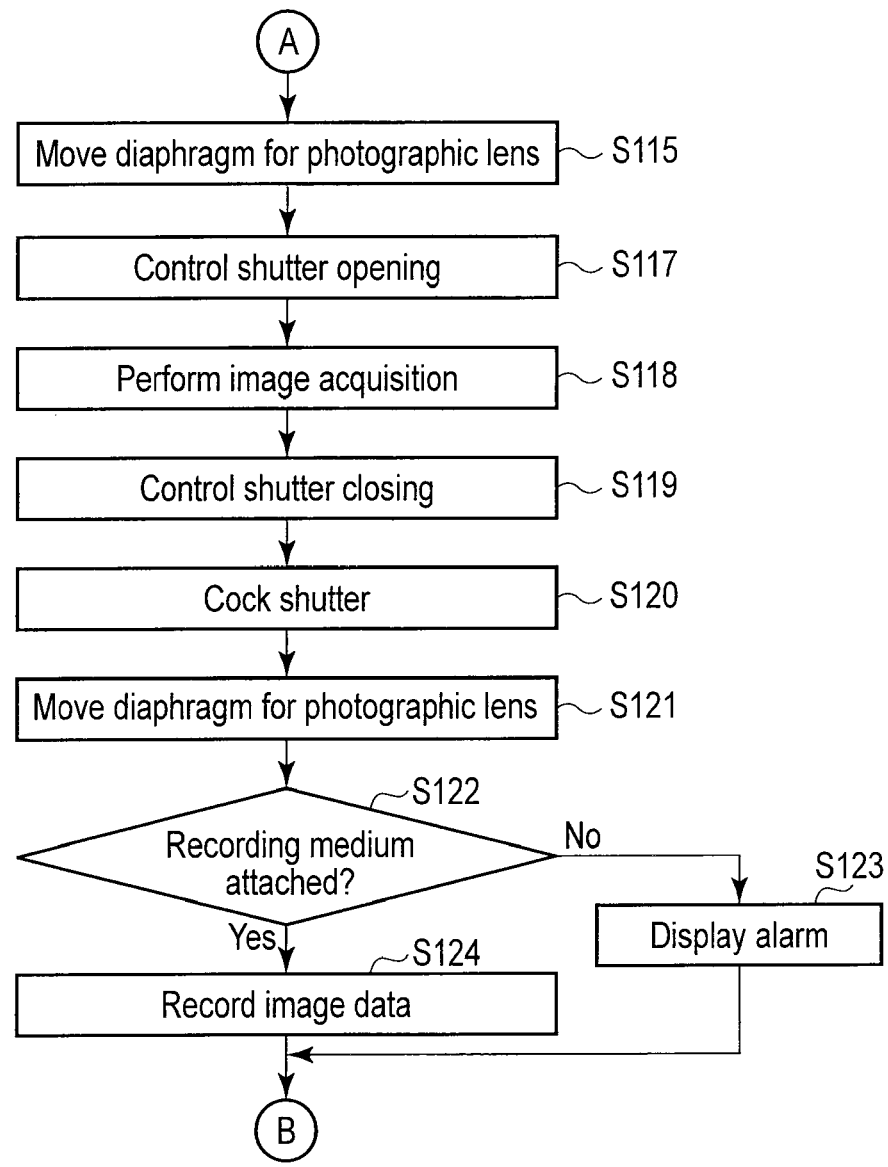
FIG. 14B is the second part of the flowchart showing the exemplary camera sequence (main routine)

To explain the above-described characteristics in detail, the control the Bucom 101 performs will be described with reference to FIGS. 14A to 18. FIGS. 14A and 14B show the flowchart that relates to the control program, which the Bucom 101 starts executing when the power switch (not shown) provided on the body unit 100 of the camera 10 is turned on.

First, a process is performed to activate the digital camera 10 (Step S101). That is, the Bucom 101 controls the power-supply circuit 135. So controlled, the power-supply circuit 135 supplies power to the other circuit units of the digital camera 10. Further, the Bucom 101 initializes the circuit components.

Next, the Bucom 101 calls a sub-routine "silent vibration," vibrating the dust filter 119, making no sound (that is, at a frequency falling outside the audible range) (Step S102). The "audible range" ranges from about 200 to 20,000 Hz, because most people can hear sound falling within this range.

Steps S103 to S124, which follow, make a group of steps that is cyclically repeated. That is, the Bucom 101 first detects whether an accessory has been attached to, or detached from, the digital camera 10 (Step S103). Whether the lens unit 200 (i.e., one of accessories), for example, has been attached to the body unit 100 is detected. This detection, e.g., attaching or detaching of the lens unit 200, is performed as the Bucom 101 communicates with the Lucom 201.

If a specific accessory is detected to have been attached to the body unit 100 (YES in Step S104), the Bucom 101 calls a subroutine "silent vibration" and causes the dust filter 119 to vibrate silently (Step S105).

While an accessory, particularly the lens unit 200, remains not attached to the body unit 100 that is the camera body, dust is likely to adhere to each lens, the dust filter 119, and the like. It is therefore desirable to perform an operation of removing dust at the time when it is detected that the lens unit 200 is attached to the body unit 100. It is highly possible that dust adheres as the outer air circulates in the body unit 100 at the time a lens is exchanged with another. It is therefore advisable to remove dust when a lens is exchange with another. Then, it is determined that photography will be immediately performed, and the operation goes to Step S106.

If a specific accessory is not detected to have been attached to the body unit 100 (NO in Step S104), the Bucom 101 goes to the next step, i.e., Step S106.

In Step S106, the Bucom 101 detects the state of a specific operation switch that the digital camera 10 has.

That is, the Bucom 101 determines whether the first release switch (not shown), which is a release switch, has been operated from the on/off state of the switch (Step S107). The Bucom 101 reads the state. If the first release switch has not been turned on for a predetermined time, the Bucom 101 discriminates the state of the power switch (Step S108). If the power switch is on, the Bucom 101 returns to Step S103. If the power switch is off, the Bucom 101 performs an end-operation (e.g., sleep).

On the other hand, the first release switch may be found to have been turned on in Step S107. In this case, the Bucom 101 acquires the luminance data about the object from the acquired image from the image process controller 126, and calculates from this data an exposure time (Tv value) and a diaphragm value (Av value) that are optimal for the image acquisition unit 116 and lens unit 200, respectively (Step S109).

Thereafter, the Bucom 101 detects the contrast of the acquired image (step S110). The Bucom 101 then determines whether the detected contrast falls within a tolerance range (step S111). If the contrast does not fall within the tolerance range, the Bucom 101 drives the photographic lens 202 (step S112) and returns to step S103.

On the other hand, the contrast may falls within the tolerance range. In this case, the Bucom 101 calls the subroutine "silent vibration" and causes the dust filter 119 to vibrate silently (step S113).

Further, the Bucom 101 determines whether the second release switch (not shown), which is another release switch, has been operated (Step S114). If the second release switch is on, the Bucom 101 goes to Step S115 and starts the prescribed photographic operation (later described in detail). If the second release switch is off, the Bucom 101 returns to Step S108.

During the image acquisition operation, the electronic image acquisition is controlled for a time that corresponds to the preset time for exposure (i.e., exposure time), as in ordinary photography.

As the above-mentioned photographic operation, Steps S115 to S121 are performed in a prescribed order to photograph an object. First, the Bucom 101 transmits the Av value to the Lucom 201, instructing the Lucom 201 to drive the diaphragm 203 (Step S115). Then, the Bucom 101 causes the front curtain of the shutter 108 to start running, performing open control (Step S117). Further, the Bucom 101 makes the image process controller 126 perform "image acquisition operation" (Step S118). When the exposure to the CCD 117 (i.e., photography) for the time corresponding to the Tv value ends, the Bucom 101 causes the rear curtain of the shutter 108 to start running, achieving CLOSE control (Step S119). Then, the Bucom 101 cocks the shutter 108 (Step S120).

Then, the Bucom 101 instructs the Lucom 210 to move the diaphragm 203 back to the open position (Step S121). Thus, a sequence of image acquisition steps is terminated.

Next, the Bucom 101 determines whether the recording medium 127 is attached to the body unit 100 (Step S122). If the recording medium 127 is not attached, the Bucom 101 displays an alarm (Step S123). The Bucom 101 then returns to Step S103 and repeats a similar sequence of steps.

If the recording medium 127 is attached, the Bucom 101 instructs the image process controller 126 to record the image data acquired by photography, in the recording medium 127 (Step S124). When the image data is completely recorded, the Bucom 101 returns to Step S103 again and repeats a similar sequence of steps.

Figure 19:
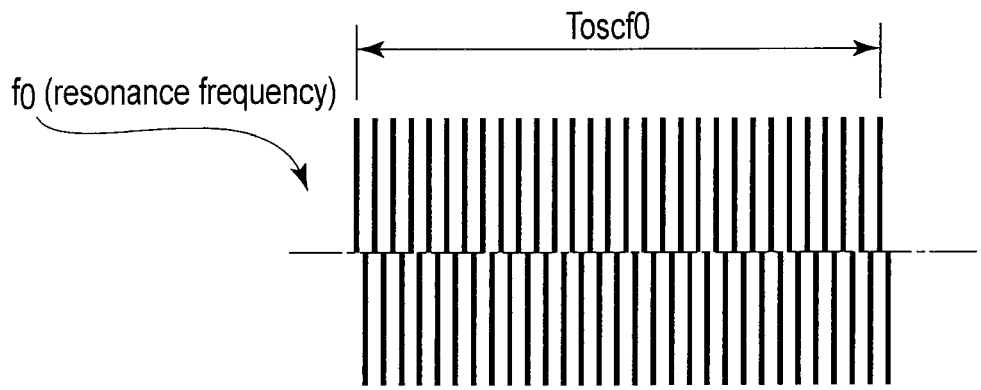
FIG. 19 is a diagram showing the form of a resonance-frequency wave continuously supplied to vibrating members during silent vibration.

In regard to the detailed relation between the vibration state and the displaying state will be explained in detail, the sequence of controlling the "silent vibration" subroutine will be explained with reference to FIGS. 15 to 18. The term "vibration state" means the state of the vibration induced by the piezoelectric element 120, i.e., vibrating members. FIG. 19 shows the form of a resonance-frequency wave that is continuously supplied to the vibrating members during silent vibration. The subroutine of FIG. 15, i.e., "silent vibration," and the subroutine of FIGS. 16 to 18, i.e., "display process" are routines for accomplishing vibration exclusively for removing dust from the dust filter 119. Vibrational frequency $f_0$ is set to a value close to the resonance frequency of the dust filter 119. In the vibrational mode of FIG. 4A, for example, the vibrational frequency is 44 kHz, higher than at least 20 kHz, and produces sound not audible to the user.

As shown in FIG. 15, when the "silent vibration" is called, the Bucom 101 first reads the data representing the drive time (Toscf0) and drive frequency (resonance frequency: Noscf0) from the data stored in a specific area of the nonvolatile memory 128 (Step S201). At this timing, the Bucom 101 causes the display unit provided in the operation display LCD 129 or operation display LED 130 to turn on the vibrational mode display, as shown in FIG. 16 (Step S301). The Bucom 101 then determines whether a predetermined time has passed (Step S302). If the predetermined time has not passed, the Bucom 101 makes the display unit keep turning on the vibrational mode display. Upon lapse of the predetermined time, the Bucom 101 turns off the displaying of the vibrational mode display (Step S303).

Next, the Bucom 101 outputs the drive frequency Noscf0 from the output port D_NCnt to the N-scale counter 183 of the dust filter control circuit 121 (Step S202).

In the following steps S203 to S205, the dust is removed as will be described below. First, the Bucom 101 sets the output port P_PwCont to High, thereby starting the dust removal (Step S203). At this timing, the Bucom 101 starts displaying the vibrating operation as shown in FIG. 17 (Step S311). The Bucom 101 then determines whether or not the predetermined time has passed (Step S312). If the predetermined time has not passed, the Bucom 101 keeps displaying the vibrating operation. Upon lapse of the predetermined time, the Bucom 101 stops displaying of the vibrating operation (Step S313). The display of the vibrating operation, at this time, changes as the time passes or as the dust is removed (how it changes is not shown, though). The predetermined time is almost equal to Toscf0, i.e., the time for which the vibration (later described) continues.

If the output port P_PwCont is set to High in Step S203, the piezoelectric element 120 vibrates the dust filter 119 at the prescribed vibrational frequency (Noscf0), removing the dust 180 from the surface of the dust filter 119. At the same time the dust 180 is removed from the surface of the dust filter 119, air is vibrated, producing an ultrasonic wave. The vibration at the drive frequency Noscf0, however, does not make sound audible to most people. Hence, the user hears nothing. The Bucom 101 waits for the predetermined time Toscf0, while the dust filter 119 remains vibrated (Step S204). Upon lapse of the predetermined time Toscf0, the Bucom 101 sets the output port P_PwCont to Low, stopping the dust removal operation (Step S205). At this timing, the Bucom 101 turns on the display unit, whereby the displaying of the vibration-end display is turned on (Step S321). When the Bucom 101 determines (in Step S322) that the predetermined time has passed, the displaying of the vibration-end display is turned off (Step S323). The Bucom 101 then returns to the step next to the step in which the "silent vibration" is called.

The vibrational frequency $f_0$ (i.e., resonance frequency Noscf0) and the drive time (Toscf0) used in this subroutine define such a waveform as shown in the graph of FIG. 19. As can be seen from this waveform, constant vibration ($f_0$=44 kHz) continues for a time (i.e., Toscf0) that is long enough to accomplish the dust removal.

That is, the vibrational mode adjusts the resonance frequency applied to the vibrating member, controlling the dust removal.

[Second Embodiment]

Figure 20:
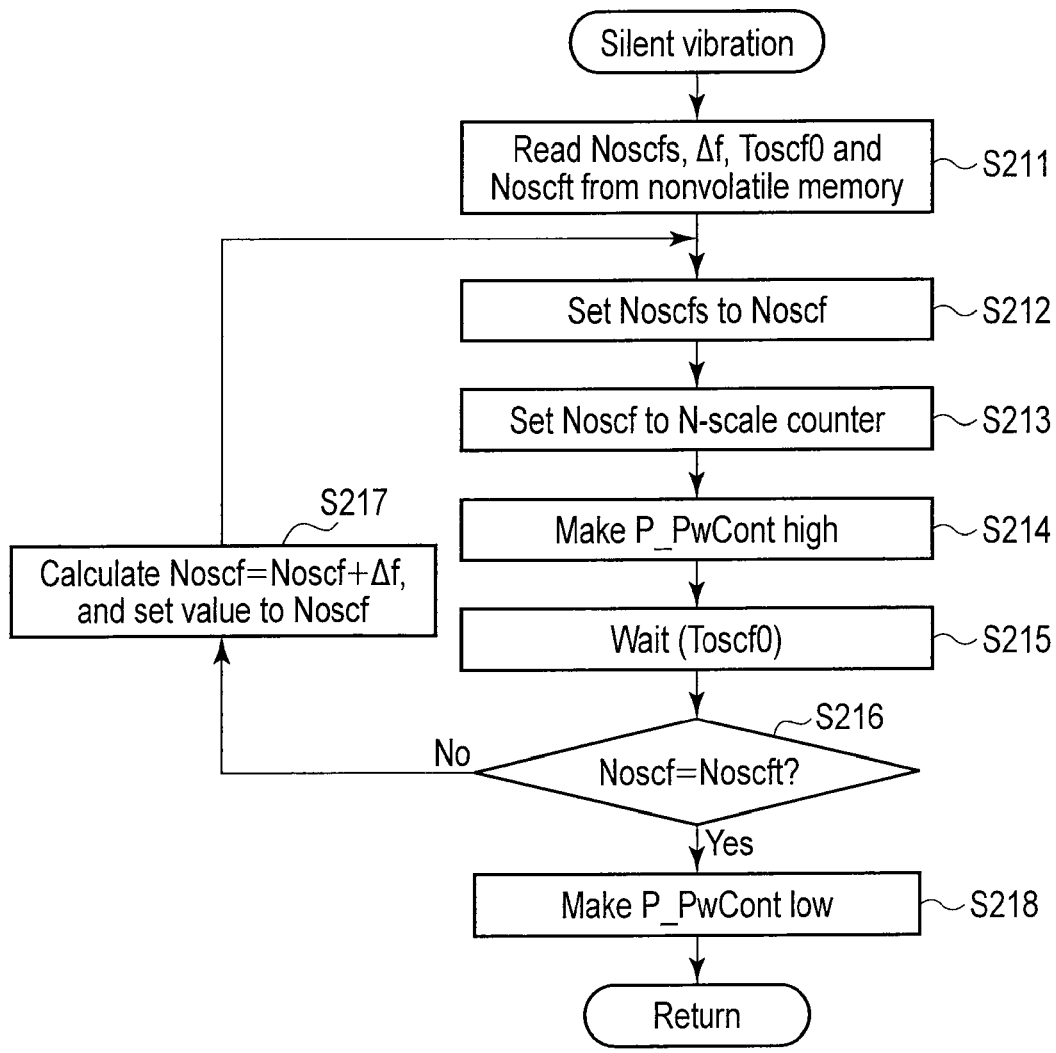
FIG. 20 is a flowchart showing the operating sequence of "silent vibration," i.e., subroutine in the operating sequence of the digital camera that is a second embodiment of the image equipment according to the present invention.

The subroutine "silent vibration" called in the camera sequence (main routine) that the Bucom performs in a digital camera that is a second embodiment of the image equipment according to this invention will be described with reference to FIG. 20. FIG. 20 illustrates a modification of the subroutine "silent vibration" shown in FIG. 15. The second embodiment differs from the first embodiment in the operating mode of the dust filter 119. In the first embodiment, the dust filter 119 is driven at a fixed frequency, i.e., frequency $f_0$, producing a standing wave. By contrast, in the second embodiment, the drive frequency is gradually changed, thereby achieving large-amplitude vibration at various frequencies including the resonance frequency, without strictly controlling the drive frequency.

Moreover, in the dust filter 119, there is an aspect ratio that the vibrational mode will greatly change (that is, the vibration speed ratio will abruptly change) if the aspect ratio changes in the dust filter 119 owing to fluctuations during the manufacture. Therefore, in the case of the dust filter 119 in which such an aspect ratio is present, it is necessary to set a precise resonance frequency in each product and to drive the piezoelectric element 120 at the frequency. This is because the vibration speed further lowers, if the piezoelectric element is driven at any frequency other than the resonance frequency. An extremely simple control circuit configuration can, nonetheless, drive the piezoelectric element precisely at the resonance frequency if the frequency is controlled as in the second embodiment. A method of control can therefore be achieved to eliminate any difference in resonance frequency between the products.

First, the Bucom 101 reads the data representing the drive time (Toscf0), drive-start frequency (Noscfs), frequency change value (Δf) and drive-end frequency (Noscft), from the data stored in a specific area of the nonvolatile memory 128 (Step S211). At this timing, the Bucom 101 causes the display unit to display the vibrational mode as shown in FIG. 16, in the same way as in the first embodiment.

Next, the Bucom 101 sets the drive-start frequency (Noscfs) as drive frequency (Noscf) (Step S212). The Bucom 101 then outputs the drive frequency (Noscf) from the output port D_NCnt to the N-scale counter 183 of the dust filter control circuit 121 (Step S213).

In the following steps S214 et seq., the dust is removed as will be described below. First, the dust removal is started. At this time, the display of the vibrating operation is performed as shown in FIG. 17, as in the first embodiment.

First, the Bucom 101 sets the output port P_PwCont to High, to achieve dust removal (Step S214). The piezoelectric element 120 vibrates the dust filter 119 at the prescribed vibrational frequency (Noscf), producing a standing wave of a small amplitude at the dust filter 119. The dust 180 cannot be removed from the surface of the dust filter 119, because the vibrational amplitude is small. This vibration continues for the drive time (Toscf0) (Step S215). Upon lapse of this drive time (Toscf0), the Bucom 101 determines whether the drive frequency (Noscf) is equal to the drive-end frequency (Noscft) (Step S216). If the drive frequency is not equal to the drive-end frequency (NO in Step S216), the Bucom 101 adds the frequency change value (Δf) to the drive frequency (Noscf), and sets the sum to the drive frequency (Noscf) (Step S217). Then, the Bucom 101 repeats the sequence of Steps S212 to S216.

If the drive frequency (Noscf) is equal to the drive-end frequency (Noscft) (YES in Step S216), the Bucom 101 sets the output port P_PwCont to Low, stopping the vibration of the piezoelectric element 120 (Step S218), thereby terminating the "silent vibration." At this point, the display of vibration-end is performed as shown in FIG. 18, as in the first embodiment.

As the frequency is gradually changed as described above, the amplitude of the standing wave increases. In view of this, the drive-start frequency (Noscfs), the frequency change value (Δf) and the drive-end frequency (Noscft) are set so that the resonance frequency of the standing wave may be surpassed. As a result, a standing wave of small vibrational amplitude is produced at the dust filter 119. The standing wave can thereby controlled, such that its vibrational amplitude gradually increases until it becomes resonance vibration, and then decreases thereafter. If the vibrational amplitude (corresponding to vibration speed) is larger than a prescribed value, the dust 180 can be removed. In other words, the dust 180 can be removed while the vibrational frequency remains in a prescribed range. This range is broad in the present embodiment, because the vibrational amplitude is large during the resonance.

If the difference between the drive-start frequency (Noscfs) and the drive-end frequency (Noscft) is large, the fluctuation of the resonance frequency, due to the temperature of the vibrator 170 or to the deviation in characteristic change of the vibrator 170, during the manufacture, can be absorbed. Hence, the dust 180 can be reliably removed from the dust filter 119, by using an extremely simple circuit configuration.

The present invention has been explained, describing some embodiments. Nonetheless, this invention is not limited to the embodiments described above. Various changes and modifications can, of course, be made within the scope and spirit of the invention.

For example, a mechanism that applies an air flow or a mechanism that has a wipe may be used in combination with the dust removal mechanism having the vibrating member, in order to remove the dust 180 from the dust filter 119.

Moreover, in the above embodiments, a liquid crystal monitor is used a viewfinder. It is of course also possible to use a single-lens reflex camera having an optical viewfinder.

In the embodiments described above, the CCD 117 is used as an image sensor element. It is of course permitted to use a CMOS and other image sensor. Further, in the embodiments, the vibrating member is piezoelectric element 120. The piezoelectric element may be replaced by electrostrictive member or super nagnetostrictive element. Furthermore, a plurality of vibrating members may be provided in peripheral portions of the dust-screening member, so that the oscillation amplitude can be greater. The transparent part of the dust-screening member may not necessarily be flat, but may be curved, for example, spherical.

In order to remove dust 180 more efficiently from the member vibrated, the member may be coated with an indium-tin oxide (ITO) film, which is a transparent conductive film, indium-zinc film, poly 3, 4 ethylenedioxy thiophene film, surfactant agent film that is a hygroscopic anti-electrostatic film, siloxane-based film, or the like. In this case, the frequency, the drive time, etc., all related to the vibration, are set to values that accord with the material of the film.

Moreover, the optical LPF 118, described as one embodiment of the invention, may be replaced by a plurality of optical LPFs that exhibit birefringence. Of these optical LPFs, the optical LPF located closest to the object of photography may be used as a dust-screening member (i.e., a subject to be vibrated), in place of the dust filter 119 shown in FIG. 2A.

Further, a camera may does not have the optical LPF 118 of FIG. 2A described as one embodiment of the invention, and the dust filter 119 may be used as an optical element such as an optical LPF, an infrared-beam filter, a deflection filter, or a half mirror.

Furthermore, the camera may not have the optical LPF 118, and the dust filter 119 may be replaced by the protection glass plate 142 shown in FIG. 2A. In this case, the protection glass plate 142 and the CCD chip 136 remain free of dust and moisture, and the structure of FIG. 2A that supports and yet vibrates the dust filter 119 may be used to support and vibrate the protection glass plate 142. Needless to say, the protection glass plate 142 may be used as an optical element such as an optical LPF, an infrared-beam filter, a deflection filter, or a half mirror.

Furthermore, the holding member 151 does not have to have an L-shaped section shown in FIG. 2A, and may have a constitution of a plate-like member surrounding an opening of the holder 145 which becomes the image forming light passing area 149, in the form of a picture frame. In this case, the plate-like holding member is fixed to the holder 145 with the adhesive or the like on the surface thereof which is orthogonal to the fitting portion 150, and around the whole periphery of the surface of the member which faces the fixing surface, there is formed the groove 152 in which the open end 119*d* of the dust filter 119 fits.

The image equipment according to this invention is not limited to the image acquisition apparatus (digital camera) exemplified above. This invention can be applied to any other apparatus that needs a dust removal function. The invention can be practiced in the form of various modifications, if necessary. More specifically, a dust moving mechanism according to this invention may be arranged between the display element and the light source or image projecting lens in an image projector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Vibrating device comprising:
    a dust-screening member disposed in front of an image surface of an image forming element, wherein the image surface is arranged to have an optical image formed thereon, wherein the dust-screening member has a box shape including a bottom surface portion having a light transmitting part through which one of light coming from the image forming element and light coming into the image forming element is transmitted, and side wall portions which are tilted with respect to the bottom surface portion by at most a predetermined angle, wherein the side wall portions extend from all end face portions of the bottom surface portion in a direction of the image forming element, and wherein at least the bottom surface portion has a substantially uniform thickness; and
    a vibrating member disposed at one of (i) a position of the bottom surface portion other than the light transmitting part of the bottom surface portion and (ii) a flat surface portion of one of the side wall portions, wherein the vibrating member is configured to apply, to the bottom surface portion of the dust-screening member, a vibrational amplitude which is perpendicular to the bottom surface portion;
    wherein the side wall portions of the dust-screening member are fixed to a fixing member via a soft holding member.

2. vibrating device comprising:
    a dust-screening member disposed in front of an image surface of an image forming element, wherein the image surface is arranged to have an optical image formed thereon, wherein the dust-screening member has a box shape including a bottom surface portion having a light transmitting part through which one of light coming from the image forming element and light coming into the image forming element is transmitted, and side wall portions which are tilted with respect to the bottom surface portion by at most a predetermined angle, wherein the side wall portions extend from all end face portions of the bottom surface portion in a direction of the image forming element, and wherein at least the bottom surface portion has a substantially uniform thickness; and
    a vibrating member disposed at one of (i) a position of the bottom surface portion other than the light transmitting part of the bottom surface portion and (ii) a flat surface portion of one of the side wall portions, wherein the vibrating member is configured to apply, to the bottom surface portion of the dust-screening member, a vibrational amplitude which is perpendicular to the bottom surface portion;
    wherein the bottom surface portion of the dust-screening member has at least one linear side, and the vibrating member is fixed to one of the side wall portions that includes the linear side.

3. vibrating device comprising:
    a dust-screening member disposed in front of an image surface of an image forming element, wherein the image surface is arranged to have an optical image formed thereon, wherein the dust-screening member has a box shape including a bottom surface portion having a light transmitting part through which one of light coming from the image forming element and light coming into the image forming element is transmitted, and side wall portions which are tilted with respect to the bottom surface portion by at most a predetermined angle, wherein the side wall portions extend from all end face portions of the bottom surface portion in a direction of the image forming element, and wherein at least the bottom surface portion has a substantially uniform thickness; and
    a vibrating member disposed at one of (i) a position of the bottom surface portion other than the light transmitting part of the bottom surface portion and (ii) a flat surface portion of one of the side wall portions, wherein the vibrating member is configured to apply, to the bottom surface portion of the dust-screening member, a vibrational amplitude which is perpendicular to the bottom surface portion;
    wherein the bottom surface portion of the dust-screening member has an oval shape, and the vibrating member is fixed along an outer periphery of the oval shape.

* * * * *